(12) United States Patent
Demiryont

(10) Patent No.: US 11,774,637 B1
(45) Date of Patent: Oct. 3, 2023

(54) THIN FILM COATINGS ON TRANSPARENT SUBSTRATES AND METHODS OF MAKING AND USING THEREOF

(71) Applicant: Eclipse Energy Systems, Inc., St. Petersburg, FL (US)

(72) Inventor: Hulya Demiryont, Redington Beach, FL (US)

(73) Assignee: ECLIPSE ENERGY SYSTEMS, INC., St. Petersburg, FL (US)

( * ) Notice: Subject to any disclaimer, the term of this patent is extended or adjusted under 35 U.S.C. 154(b) by 385 days.

(21) Appl. No.: 17/173,881

(22) Filed: Feb. 11, 2021

Related U.S. Application Data

(63) Continuation of application No. 15/622,258, filed on Jun. 14, 2017, now Pat. No. 10,948,628.

(51) Int. Cl.
*G02B 5/08* (2006.01)
*G02B 5/20* (2006.01)
(Continued)

(52) U.S. Cl.
CPC ............... *G02B 1/115* (2013.01); *E06B 9/24* (2013.01); *G02B 5/208* (2013.01); *G02F 1/155* (2013.01);
(Continued)

(58) Field of Classification Search
CPC .......... G02B 1/00; G02B 1/001; G02B 1/005; G02B 1/007; G02B 1/02; G02B 1/04;
(Continued)

(56) References Cited

U.S. PATENT DOCUMENTS

| | | |
|---|---|---|
| 5,763,064 A | 6/1998 | Suzuki et al. |
| 6,040,939 A | 3/2000 | Demiryont et al. |
| | (Continued) | |

OTHER PUBLICATIONS

Nehru et al., "Studies on Structural, Optical and Electrical Properties of ZnO Thin Films Prepared by the Spray Pyrolysis Method", International Journal of Material Engineering, Feb. 2012; Scientific & Academic Publishing, pp. 12-17.

*Primary Examiner* — Thong Q Nguyen
(74) *Attorney, Agent, or Firm* — Shumaker, Loop & Kendrick, LLP

(57) ABSTRACT

Disclosed are transparent articles having a substrate adapted for carrying a transparent and electrically conductive thin film thereon. The thin film includes an optical matching-stress releasing layer directly deposited on the substrate; a first antireflection layer directly deposited on the optical matching layer; a metal layer adapted for infra-red reflection and electrical conductivity directly deposited on the first antireflection layer; a second antireflection layer deposited directly on the metal layer adapted for high visibility and infra-red transmission, and an optionally visible and infra-red region transparent outermost protective layer deposited on the second antireflection layer. In certain aspects, no buffer layer is positioned between the metal layer adapted for infra-red reflection and electrical conductivity and the second antireflection layer. The transparent articles have various uses including electrodes used in electrochromic devices and as glass treatments due to unique transparent, transmissive, and reflective properties.

33 Claims, 24 Drawing Sheets

(51) Int. Cl.
*G02B 1/10* (2015.01)
*G02B 1/115* (2015.01)
*G02F 1/155* (2006.01)
*E06B 9/24* (2006.01)

(52) U.S. Cl.
CPC ............. *E06B 2009/2417* (2013.01); *E06B 2009/2464* (2013.01)

(58) Field of Classification Search
CPC . G02B 1/045; G02B 1/10; G02B 1/11; G02B 1/111; G02B 1/113; G02B 1/116; G02B 1/118; G02B 1/14; G02B 1/16; G02B 5/00; G02B 5/003; G02B 5/20; G02B 5/208; G02B 5/22; G02B 5/226; G02B 5/28; G02B 5/281; G02B 5/282
USPC .................................. 359/350–361, 577–598
See application file for complete search history.

(56) References Cited

U.S. PATENT DOCUMENTS

| | | | |
|---|---|---|---|
| 7,405,872 B2 * | 7/2008 | Simpson | H05K 9/0096 359/359 |
| 10,948,628 B1 | 3/2021 | Demiryont | |
| 2009/0047509 A1 | 2/2009 | Gagliardi et al. | |
| 2014/0247480 A1 | 9/2014 | Tatemura et al. | |
| 2016/0002100 A1 | 1/2016 | Melcher et al. | |
| 2016/0003989 A1 * | 1/2016 | Watanabe | C23C 14/086 359/359 |
| 2016/0077255 A1 | 3/2016 | Singh et al. | |
| 2016/0351842 A1 | 12/2016 | Park | |

\* cited by examiner

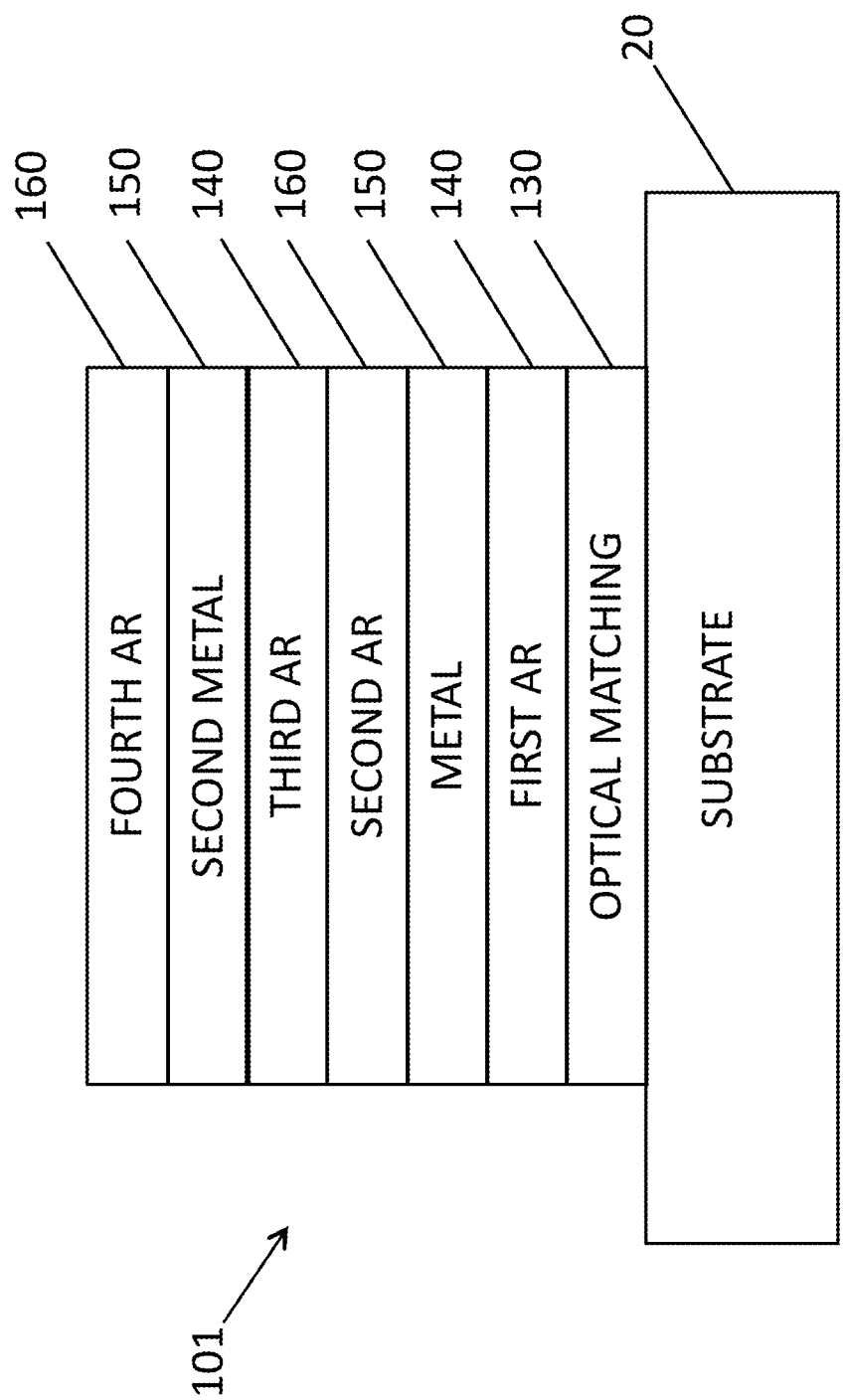

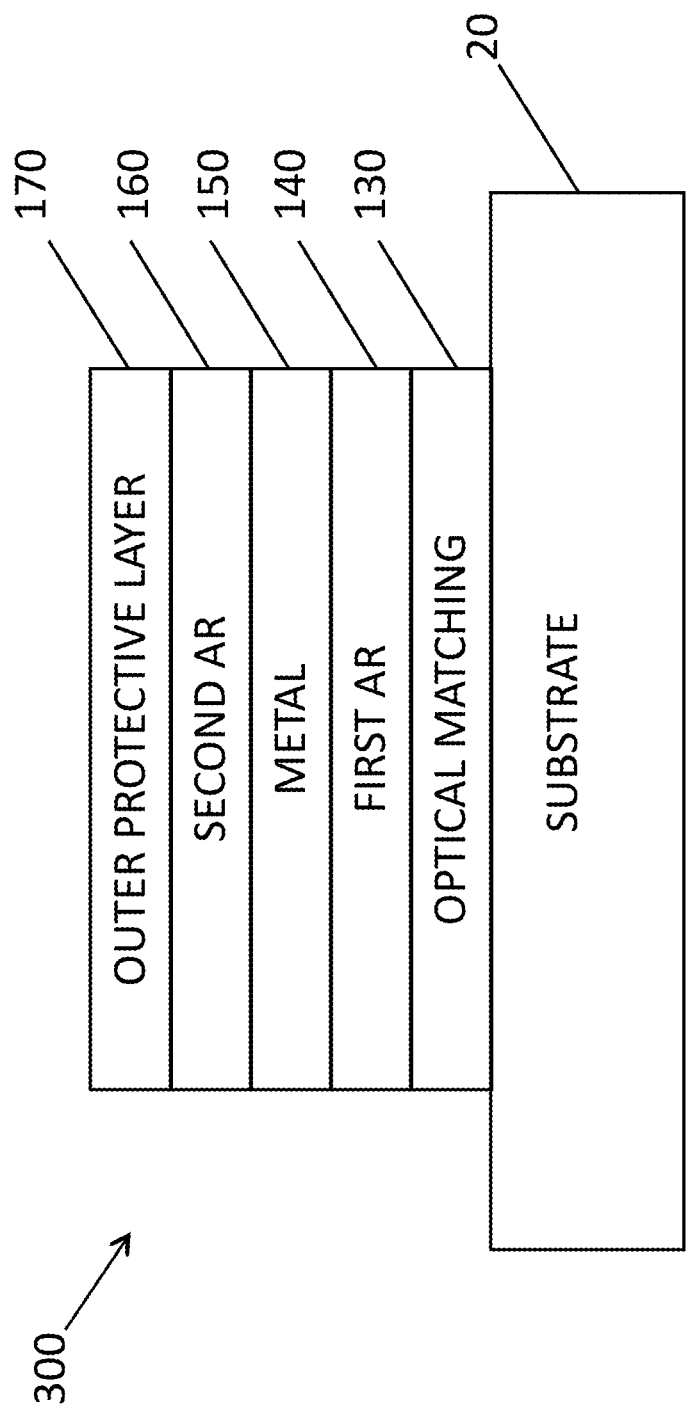

THIN FILM COATINGS ON TRANSPARENT SUBSTRATES AND METHODS OF MAKING AND USING THEREOF

TECHNICAL FIELD

The present invention generally relates to the field of thin film coatings, and more particularly, to thin film coatings on transparent substrates having anti-solar, low emissivity, and/or electrically conductive properties.

BACKGROUND

FIG. 1A depicts a conventional thin film coating system 10 (e.g. low emissivity coating systems) that utilizes a first antireflection layer 30 (first dielectric layer) deposited directly on a surface of a transparent substrate 20, followed by a metal layer 40 deposited on the first antireflection layer 30, a buffer layer 50 deposited on the metal layer 40, and then a second antireflection layer 60 (second dielectric layer) deposited on the buffer layer 50. In these conventional systems 10, the thickness of the metal layer 40 is selected to provide adequately low emissivity while maintaining sufficiently high transmittance of visible light to meet the requirements of the intended application. The thickness of the first and second antireflection layers 30, 60 is typically selected to achieve adequate anti-reflectance for the metal film while the entire multi-layer coating on the substrate preferably exhibits high transparency to visible light and high reflectance to infrared. FIG. 1B further depicts another conventional thin film coating system 90 that is very similar to FIG. 1A but this coating system 90 further includes a second metal layer, a second buffer layer, and a third (outermost) antireflection layer. The thin film coating system shown in FIG. 1B is commonly referred to as a double low-e (low emissivity coating systems).

As alluded to above and where the metal layer 40 employs silver or other high conductivity metal(s) (e.g., Ag, Au, Ag—Au, Cu, Al, Pd, etc.), a buffer layer 50 of Ni, Cr, Ti, Ni—Cr, or Si as disclosed in U.S. Pat. No. 6,040,939, is typically deposited over metal layer 40. Buffer layer 50 may interact with and oxidize during the deposition of the second antireflection layer 60, thereby forming an oxidized layer of, for example, Ni, Cr, Ti, Si, or Ni—Cr. However, buffer layer 50 to reduces and/or inhibits the reaction of oxygen or other reactive gas with the metal layer 40 during deposition of the second antireflection layer 60. Thus, buffer layer 50, in theory, reduces and/or prevents oxidation of metal layer 40, which in turn preserves anti-solar, low emissivity, and electrically conductive properties of these conventional films 10.

Although these conventional thin film coating systems 10 have numerous uses in industry such as coatings on window panes and/or as electrode(s) in dynamic optical films like electrochromic device(s), liquid crystal panels, electrodes for photovoltaic devices, light emitting devices (LED, OLED), and radio frequency shielding applications various difficulties have been encountered by those skilled in the art when making and/or using these conventional coating systems 10. In particular, it has proved difficult to achieve low emissivity coatings which also provide good attenuation of direct solar radiation, that is, good anti-solar properties. Furthermore, these conventional coating systems 10 have a limited shelf life in which a coated surface can only be exposed to air for days (or in some instances only hours) without substantial degradation of film quality due to, for example, migration of oxygen or moisture from the atmosphere into the coating thereby reacting with the coated materials, which degrades the coating's uniform appearance, anti-solar properties, low emissivity properties, electrically conductive properties, or any combination thereof. Furthermore, because these conventional systems 10 require deposition of an uniform buffer layer 50 over the metal layer 40 before deposition of the second antireflection layer 60, increased time, materials, and complexity are required when applying these coating systems on desired surfaces.

To further evidence this fact, these coating systems are frequently deposited (e.g., via sputter or e-beam deposition) on, for example, glazed window panels. In this regard, substantial manufacturing process complexity and production waste occurs when the sputtered multi-layer coating 10 on a glazing panel (e.g. substrate 20) deteriorates significantly if it is not immediately laminated or otherwise assembled into a multi-pane window to protect the coating from exposure to air.

BRIEF SUMMARY

Therefore, a need exists to provide transparent articles that overcome the above mentioned problems. Accordingly, the transparent articles disclosed herein preferably exhibit anti-solar, low emissivity, and/or electrically conductive properties and can be preferably stored indefinitely while concurrently maintaining high environmental stability and durability for years without needing to be immediately laminated and/or assembled into a multi-pane window assemblies, thus avoiding degradation issues exhibited by conventional thin film coating systems. In other words, the disclosed transparent articles have high durability and are not easily degraded at ambient humidity and/or room temperature. The transparent articles disclosed herein can be formed on transparent flexible, rigid flat, textured surfaces, or fabrics. In certain aspects, the transparent articles are flexible and/or rollable (e.g., rolling on a cylinder of a roll to roll coater, and/or 1 cm radius, 0.75 cm, or 0.5 cm, of curvature) without losing conductive performance, and the disclosed thin films/coatings disclosed herein are heatable up to 500° C. without losing electrical conductance.

Specifically disclosed herein are transparent articles including a substrate adapted for carrying a transparent and electrically conductive thin film thereon, the thin film includes an optical matching, adhesion promoting, stress releasing layer (also referred to herein as the "optical matching stress releasing layer), a first antireflection layer, a metal layer adapted for infra-red reflection and electrical conductivity, and a second antireflection layer; the optical matching, adhesion promoting, stress releasing layer is directly deposited on the substrate at a thickness ranging from 1000 Å to 10,000 Å; the first antireflection layer is directly deposited on the optical matching, adhesion promoting, stress releasing layer at a thickness ranging from 100 Å to 1000 Å; the metal layer adapted for infra-red reflection and electrically conductive film is directly deposited on the first antireflection layer at a thickness ranging from 50 Å to 400 Å; the second antireflection layer is directly deposited on the metal layer adapted for infra-red reflection at a thickness ranging from 100 Å to 1000 Å, and optionally an outermost protective transparent layer is deposited on the second antireflection layer at a thickness ranging from 100 Å to 10,000 Å. The disclosed transparent article has no buffer layer positioned between the metal layer adapted for infra-red reflection and electrical conductivity and the second antireflection layer. In certain aspects, a third antireflection layer is directly deposited on the second antireflection layer at a thickness ranging from 100 Å to 1000 Å, the third antireflection layer is preferably made from the same material and has substantially the same thickness as the first antireflection layer (the total thickness of the second and third AR layers is preferably approximately double the thickness of first antireflection layer), a second metal layer adapted for infra-red reflection and electrical conductivity is directly deposited on the third antireflection layer at a thickness ranging from 50 Å to 400 Å; and a fourth antireflection layer that is directly deposited on the second metal layer adapted for infra-red reflection at a thickness ranging from 100 Å to 1000 Å, the fourth antireflection layer made from the same material and having substantially the same thickness as the second antireflection layer—with the proviso that no buffer layer is deposited between the second metal layer and the fourth antireflection layer. In certain embodiments, the outermost protective transparent layer is directly deposited on the fourth antireflection layer at a thickness ranging from 100 Å to 10,000 Å.

In certain aspects, the article has an optical transparency of at least 30% between a wavelength ranging from 380 nm to 780 nm and has at least 30% of total solar reflectance of heat rejection at a wavelength ranging from 380 nm to 2200 nm. In certain aspects, an optical transparency of at least 40%, at least 50% or at least 60% between a wavelength ranging from 380 nm to 780 nm and has at least 40%, at least 50%, or at least 60% of total solar reflectance of heat rejection at a wavelength ranging from 380 nm to 2200 nm. The article may further have a sheet resistance ranging from 1.2 Ohm/square to 120 Ohm/square.

In certain aspects, the first and second antireflection layers independently include at least one of W or oxides thereof (e.g., $WO_3$), Sn or oxides thereof (e.g., $SnO_2$), Zn or oxides thereof (e.g., ZnO), Ti or oxides (e.g., $TiO_2$) or nitrides thereof, Al or oxides thereof, Ta or oxides thereof (e.g., $Ta_2O_5$), Hf or oxides thereof, Nb or oxides thereof, an indium tin oxide (ITO), Bi or oxides thereof (e.g., $Bi_2O_3$), Ce or oxides thereof, Pr or oxides thereof, Ni or oxides thereof, aluminum doped zinc oxide (AZO), or indium doped zinc oxide (IZO).

In certain aspects, the first and second antireflection layers of the article each comprise W or oxides thereof.

In certain aspects, the first antireflection layer of the article is $WO_3$. In certain aspects, the second antireflection layer of the article is W and $WO_3$.

In certain aspects, the first antireflection layer of the article is $WO_3$. In certain aspects, the second antireflection layer of the article is $WO_3$.

In certain aspects, the metal layer adapted for infra-red reflection and electrical conductivity comprises at least one of Ag, Au, Ag—Au, Pt, Cu, Al, Ti, Pd, Ni, Rd, or Zn. In certain aspects, the metal layer adapted for infra-red reflection and electrical conductivity is Ag.

In certain aspects, the substrate includes at least one of glass, polymer materials may be used including polycarbonate film(s), polyester film(s) including a polyethylene terephthalate film (e.g., Melinex® manufactured by DuPont Teijin Films), and/or Fluorocarbon and fluorohydrocarbon materials. Representative organic polymers include polyesters such as poly(ethyleneterephthalate) ("PET"), polycarbonates, polyacrylates and methacrylates such as poly(methylmethacrylate) ("PMMA"), poly(methacrylate), poly(ethylacrylate) and copolymers such as poly(methylmethacrylate-co-ethylacrylate). Fluorocarbon polymers such as Teflon® can be used as well. Other polymers have indices of refraction below that of the antireflection coatings may be used, if desired.

In certain aspects, the transparent and electrically conductive thin film maintains, without loss, optical and electrical properties for up to nine years when stored at ambient humidity and/or room temperature.

In certain aspects, each of the optical matching, adhesion promoting, stress releasing layer, the first antireflection layer, the metal layer, and the second antireflection layer are uniformly deposited in the article.

In certain aspects, the outermost protective transparent layer is present in the article, the outermost protective transparent layer may include a poly(p-xylylene) outer coating (e.g., Parylene C Parylene N, Parylene F). In certain aspects, the outermost protective transparent layer ranges in thickness from 1,000 Å to 10,000 Å, and more preferably 500 Å to 5,000 Å, and is transparent in the spectral region measured from 0.35 μm to 25 μm. In certain aspects, it is preferable that the outermost protective transparent layer is highly durable, washable with DI water, and/or air blow dryable. The outermost protective transparent layer is also inert for cleaning solutions, such as alcohol, detergent, and ammonia in which the outermost protective layer may be contacted with cleaning solutions and gently rubbed with a microfiber cloth. It is a hydrophobic material so forms condensation resistant surface. Parylene has very low vapor pressure, 10 to −9, which allows it to be used in multiple environments and climates—even including a space environment (e.g., components in space shuttles, etc.). In certain aspects, the outermost protective transparent layer is applied as a surface coating for cold climate Low-e windows and includes high transparency from 380 nm to 12 microns heat region, sensor region (3-5 microns) optical window/viewport surface protection, and protection of thermal region equipment windows (8 to 12 microns).

In certain aspects, the transparent article has an electrical sheet resistance ranging from 1 to 120 Ohm/sq. In certain aspects the article has an electrical sheet resistance ranging from 1 to 20 Ohm/sq for RF shielding transparent windows, 2 to 50 Ohm/sq, for Low-e windows, or 2 to 50 Ohm/sq. for transparent electrodes.

In certain aspects, the article is an electrode adapted for use in an optoelectrical devices, such as electrochromic windows/displays, liquid crystals devices/displays, light emitting diodes (LED, OLED), electrode for solar cells.

In certain aspects, the article is adapted for adhering to a glass window and/or for retrofitting onto a glass window. In this aspect, the transparent article exhibits electromagnetic interference (EMI) shielding properties. EMI shielding of transparent windows is important for displays, infrared cameras and electronic communication privacy rooms. For example, the transparent articles may achieve a shielding attenuation of −45 dB for ~1 Ohm/sq sheet resistance and visible transparency of 45% with shielding at a frequency of 10 GHz to 100 GHz. 2.6 Ohm/sq 81% transparent coating system deposited on PET substrate that reaches −35 dB shielding efficiency from 10 GHz to 100 GHz region.

Also disclosed herein are methods of preparing the above mentioned transparent article(s). The methods include (a) providing a substrate adapted to carry a transparent and electrically conductive thin film thereon, the thin film including an optical matching, adhesion promoting, stress releasing layer, a first antireflection layer, a metal layer adapted for infra-red reflection and electrical conductivity, a second antireflection layer, and an optional transparent outermost protective transparent layer; (b) depositing the optical matching stress releasing layer directly on the substrate at a thickness ranging from 1000 Å to 10,000 Å; (c) depositing the first antireflection layer directly on the optical matching, adhesion promoting, stress releasing layer at a thickness ranging from 100 Å to 1000 Å; (d) depositing the metal layer adapted for infra-red reflection and electrical conductivity directly deposited on the first antireflection layer at a thickness ranging from 50 Å to 400 Å; (e) depositing the second antireflection layer directly on the metal layer adapted for infra-red reflection at a thickness ranging from 100 Å to 1000 Å thereby forming the transparent article, and (f) optionally depositing an outermost protective transparent layer on the second antireflection layer at a thickness ranging from 100 Å to 10,000 Å, wherein: no buffer layer is positioned between the metal layer adapted for infra-red reflection and electrical conductivity and the second antireflection layer, and the transparent and electrically conductive thin film maintains, without loss, optical and electrical properties for up to nine years when stored at ambient humidity and/or room temperature. In certain aspects, the method further includes depositing a third antireflection layer directly on the second antireflection layer at a thickness ranging from 100 Å to 1000 Å, the third antireflection layer made from the same material and having substantially the same thickness as the first antireflection layer; depositing a second metal layer adapted for infra-red reflection and electrical conductivity directly on the third antireflection layer at a thickness ranging from 50 Å to 400 Å; and depositing a fourth antireflection layer directly on the second metal layer adapted for infra-red reflection at a thickness ranging from 100 Å to 1000 Å, the fourth antireflection layer made from the same material and having substantially the same thickness as the second antireflection layer—with the proviso that no buffer layer is deposited between the second metal layer and fourth antireflection layer. In certain aspects, an outermost protective transparent layer is directly deposited on the fourth antireflection layer at a thickness ranging from 100 Å to 10,000 Å.

In certain aspects, step (e) includes depositing a second metal layer on the metal layer of step (d) and subsequently oxidizing the second metal layer thereby forming the second antireflection layer including a metal oxide therein.

In certain aspects, the articles made with the above disclosed methods have an optical transparency of at least 30% between a wavelength ranging from 380 nm to 780 nm and has at least 30% heat rejection at a wavelength ranging from 380 nm to 2200 nm. In certain aspects, an optical transparency of at least 40%, at least 50% or at least 60% between a wavelength ranging from 380 nm to 780 nm and has at least 40%, at least 50%, or at least 60% of total solar reflectance of heat rejection at a wavelength ranging from 380 nm to 2200 nm. In certain aspects, the articles made with the above disclosed methods have 85% to 98% coated-surface-reflection around the heat region ranging from 8-12 microns.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIGS. 2A, 2B, 2C, and 2D depict first, second, third, and fourth embodiments of the transparent articles disclosed herein with each article omitting a buffer layer between the first metal and second antireflection layers, and when present, omitting a buffer layer between the second metal and fourth antireflection layers;

FIGS. 3A and 3B depict a fifth and sixth embodiment of the transparent articles that correspond to the first and second embodiments in FIGS. 2A and 2B with each respectively further including an outer protective transparent layer;

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1A:
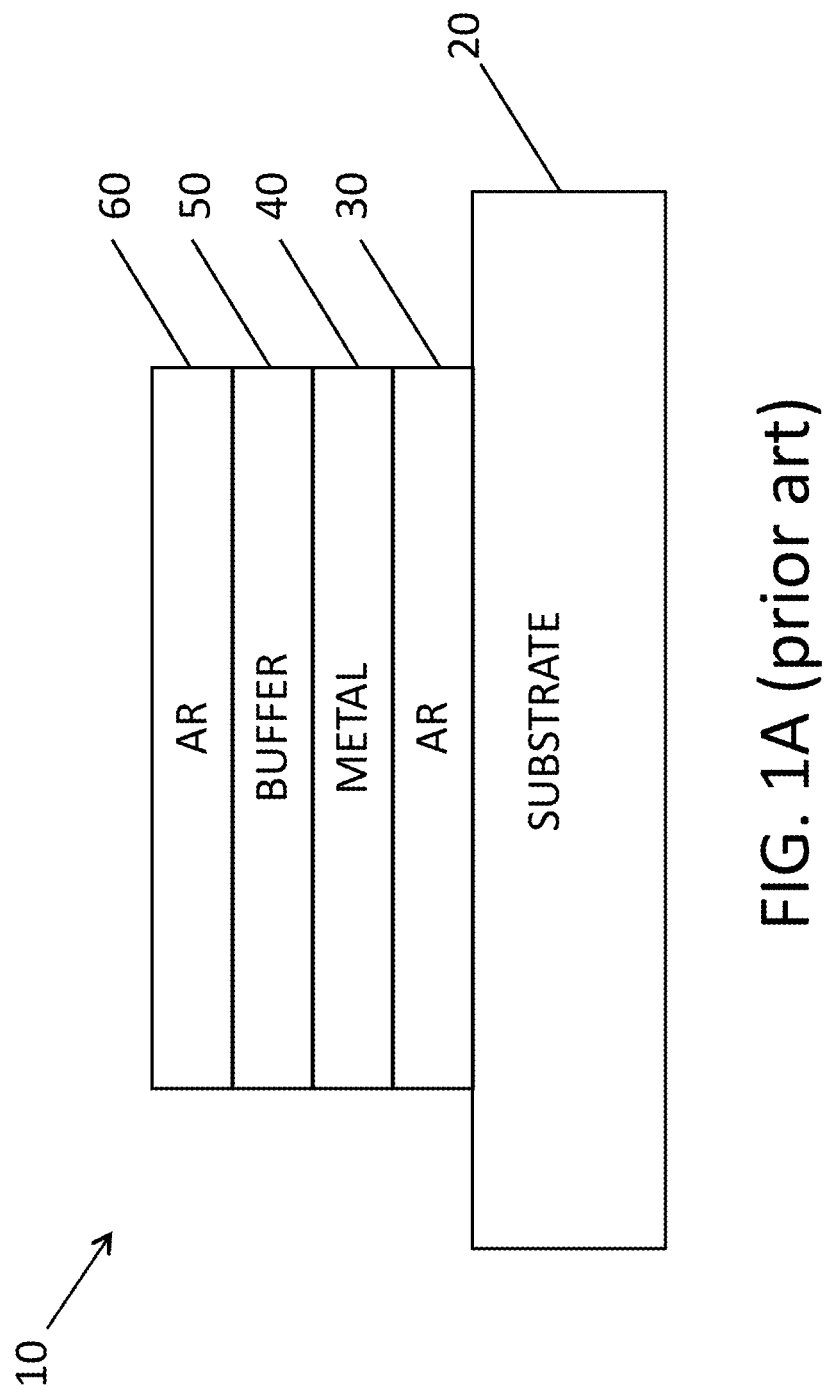
FIGS. 1A and 1B depict transparent articles according to the prior art having a buffer layer(s) deposited directly between its metal and antireflection layers.
Figure 1B:
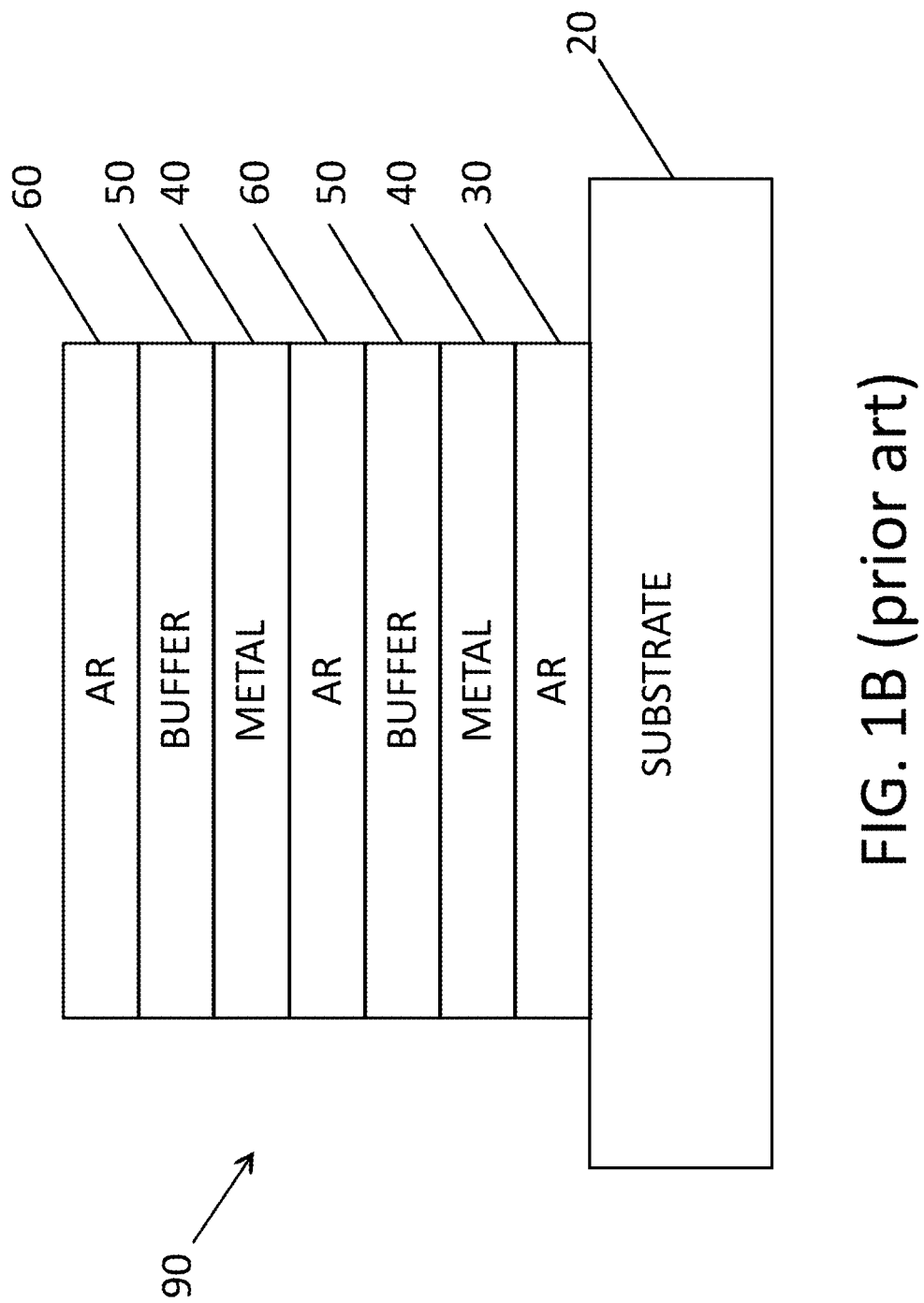
Figure 2A:
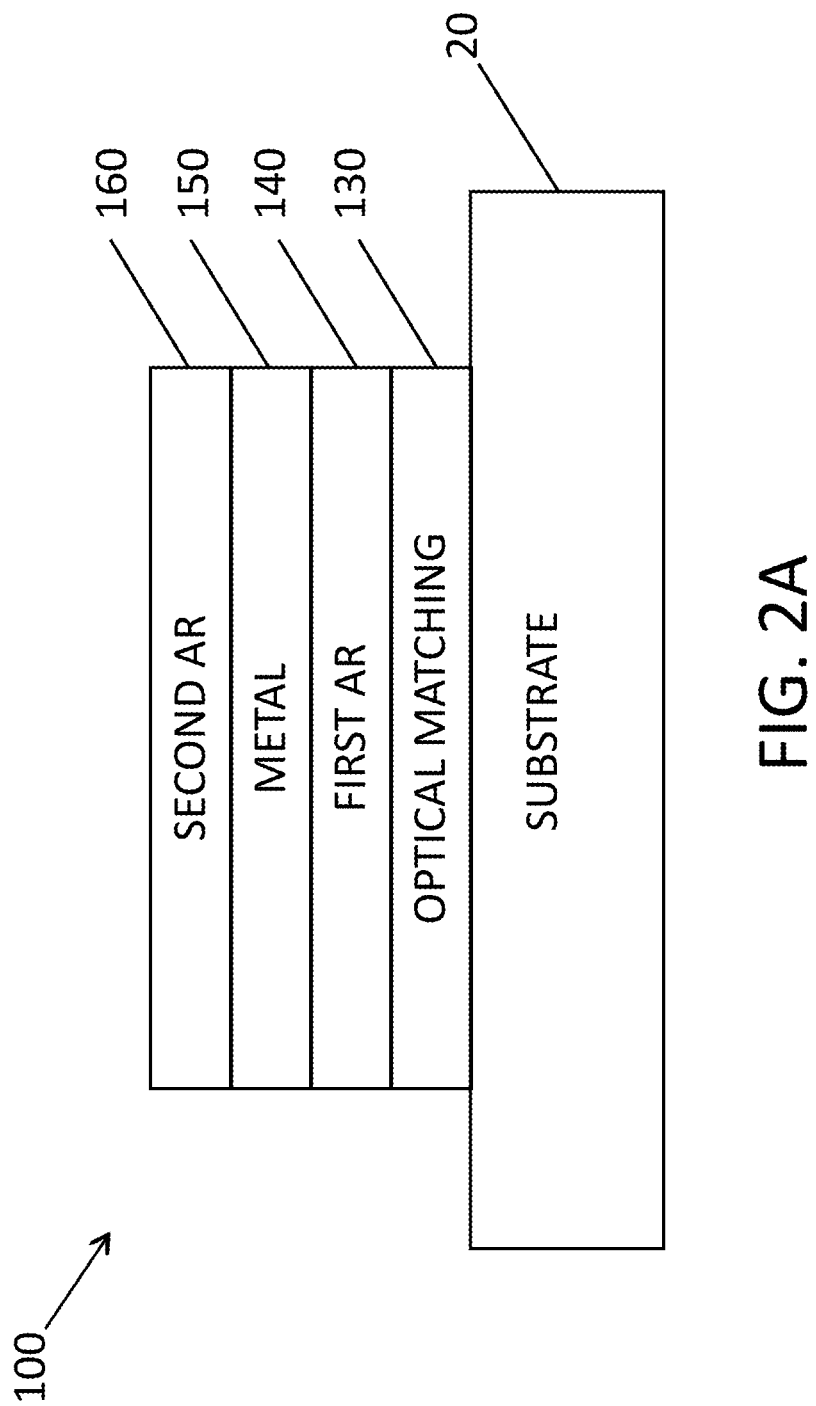
Figure 2B:
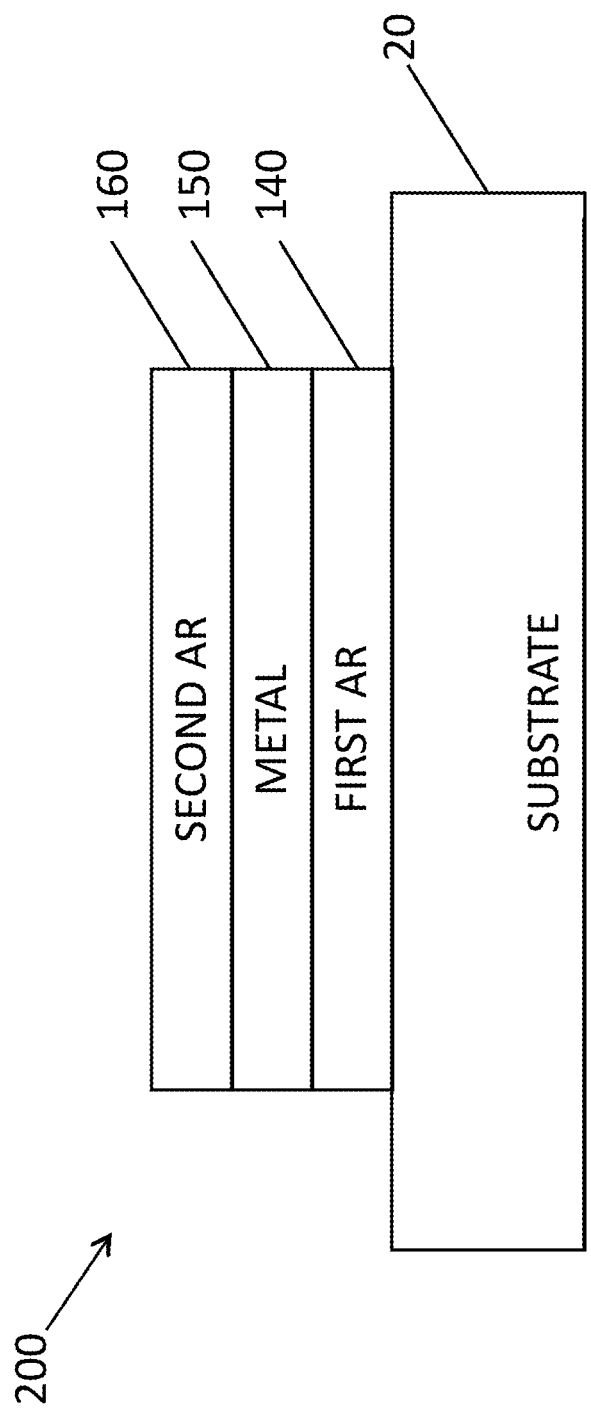
Figure 2D:
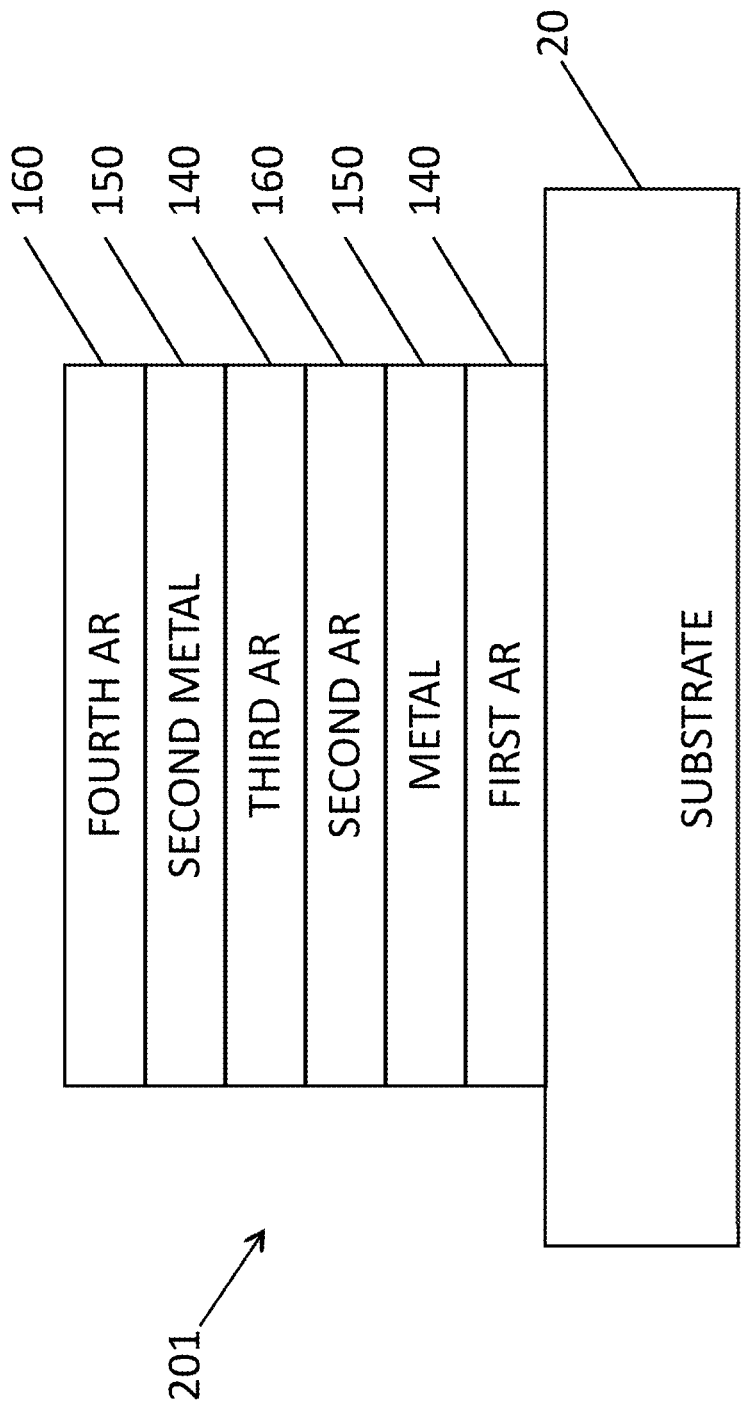
Figure 3B:
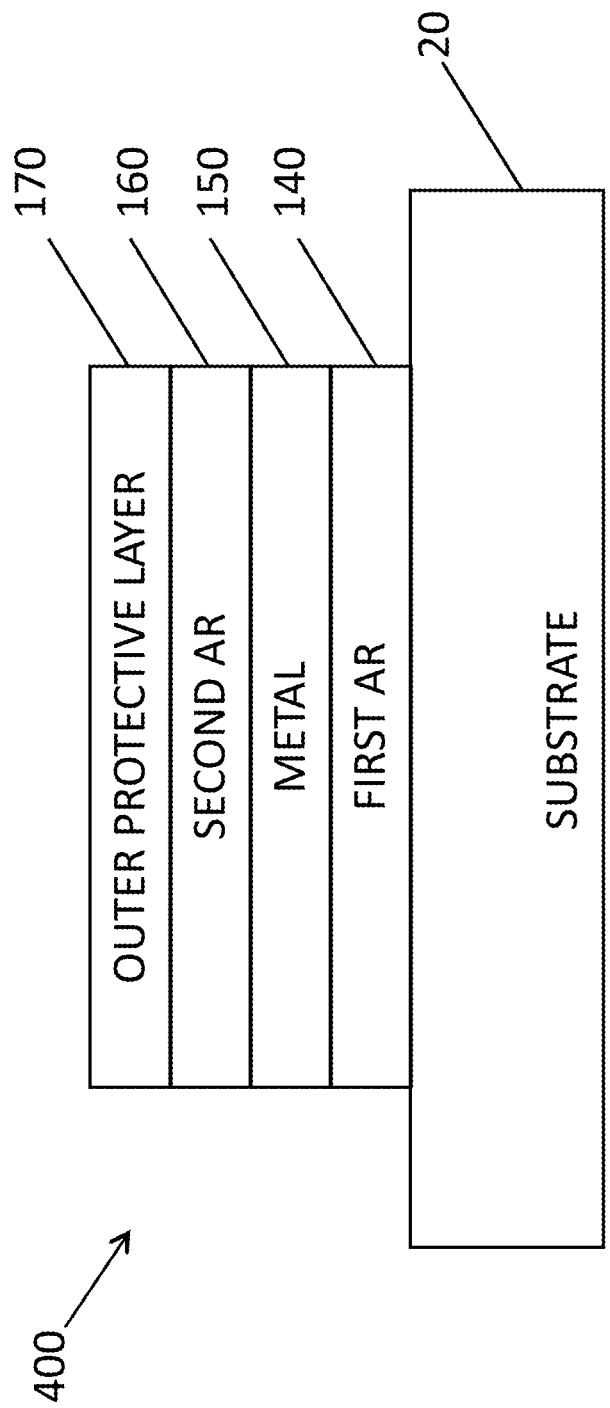
Figure 4:
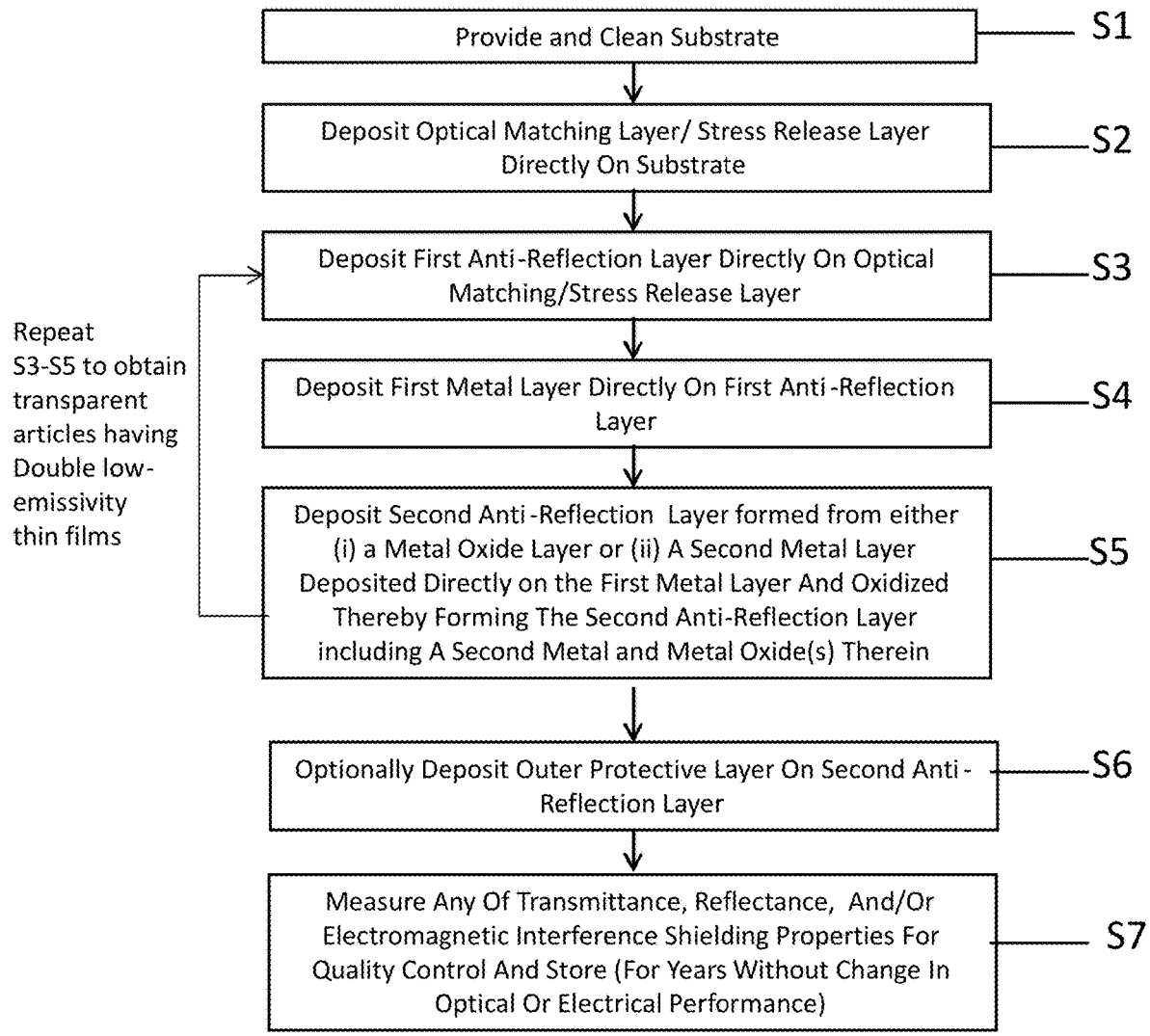
FIG. 4 schematically depicts steps in the method of making the transparent articles disclosed herein.

FIGS. 2A-3B depict various transparent articles 100, 101, 200, 201, 300, 400 disclosed herein, and FIG. 4 further schematically depicts the steps for making the transparent articles disclosed herein. These transparent articles preferably exhibit anti-solar, low emissivity, electrically conductive properties, and/or electromagnetic shielding properties and can be preferably stored indefinitely while concurrently maintaining high environmental stability and durability for years without needing to be immediately laminated and/or assembled into a multi-pane windows (e.g., FIGS. 5A and 5C), thus avoiding degradation issues exhibited by conventional thin film coating systems. The transparent articles disclosed herein can be formed on transparent flexible, rigid flat, textured surfaces, or fabrics (collectively referred to as substrate 20) as further disclosed herein.

FIGS. 2A and 2B depict a first embodiment 100 and a second embodiment 200 of the disclosed transparent articles, and FIGS. 2C and 2D disclose a third embodiment 101 and a fourth embodiment 201 respectively. Each of these embodiments utilize a substrate 20, a first antireflection layer 140, a first metal layer 150, and a second antireflection layer 160, wherein no buffer layer (e.g., a buffer layer comprising Ni, Cr, Ti, Si, Ni—Cr, and/or oxides thereof) is deposited between the first metal layer 150 and the second antireflection layer 160. As shown in FIGS. 2B and 2D when compared with FIGS. 2A and 2C, in certain aspects the optical matching/adhesion layer 130 may be omitted from the transparent articles depending on the selected substrate 20. As further shown in FIGS. 2C and 2D and when compared to FIGS. 2A and 2B, in certain aspects a third antireflection layer 140, a second metal layer 150, and a fourth antireflection layer 160 may be deposited in the transparent articles 101, 201 that also omit a buffer layer (e.g., a buffer layer comprising Ni, Cr, Ti, Si, Ni—Cr, and/or oxides thereof) deposited between the second metal layer and fourth antireflection layer when a second metal layer and fourth antireflection layer are present in the articles. When the third antireflection layer is present, the overall thickness of the second and third antireflection layers (combined) are approximately double the total thickness of the first antireflection layer. The embodiments shown in FIGS. 2C and 2D are generally referred to as double low-e articles.

Specifically, the transparent articles disclosed in FIGS. 2A-2D include a substrate 20 adapted for carrying a transparent and electrically conductive thin film thereon, the thin film including, in certain embodiments, an optical matching stress releasing layer 130, a first antireflection layer 140, a first metal layer 150 adapted for infra-red reflection and electrical conductivity, and a second antireflection layer 160.

In certain aspects and as shown in FIGS. 2A, 2C, and 4, the optical matching stress releasing layer 130 (when present) is directly deposited on the substrate 20 at a thickness ranging from 1000 Å to 10,000 Å. In certain instances and in order to eliminate reflectance and/or surface tension between the substrate-thin film interface, the optical matching stress releasing layer 130 (also referred herein as "optical matching, adhesion promoting, stress releasing layer") may be present. When present, the optical-matching, adhesion promoting, stress releasing layer material selected depends on the substrate utilized. For applications in the visible portion of the spectrum (e.g., displays, window panes, etc.) the substrate may be a glass, such as a borosilicate glass, or a plastic, such as polyethyleneterephtalate (PET), polyimide, or any other transparent plastic. For applications in the infra-red portion of the spectrum the substrate may be made of many suitable materials known to be transparent in the spectral region of interest. Materials of this sort include, but are not limited to, silicon, germanium, zinc sulfide, and zinc selenide.

For the articles disclosed herein, the optical matching stress releasing layer 130 is generally a silicon-containing film (e.g., a silicon dioxide film) having a thickness ranging from 1000 Å to 10,000 Å, with a preferred thickness ranging from 3000 Å to 7000 Å for both visible and IR transparent conditions. In order to eliminate reflectance and contamination, from the substrate-thin film interface, and stress created by the deposited film a graded density coating or a matching coating system is employed in preferred embodiments. Thus, in some embodiments, e.g. where silicon is used as the substrate, the optical matching stress releasing layer 130 is a graded silicon-oxygen film in which the silicon to oxygen composition ratio the metallic conduction film (first metal layer 150 and/or second metal layer 150).

As shown in FIGS. 2A-3B and as further detailed in FIG. 4, a first antireflection layer 140 is directly deposited either on the substrate 20 or on the optical matching stress releasing layer 130 at a thickness ranging from 100 Å to 1000 Å and more preferably ranges from 200 Å to 600 Å. The first antireflection layers 140 include at least one of W or oxides thereof (e.g., $WO_3$), Sn or oxides thereof (e.g., $SnO_2$), Zn or oxides thereof (e.g., ZnO), Ti or oxides (e.g., $TiO_2$) or nitrides thereof, Al or oxides thereof, Ta or oxides thereof (e.g., $Ta_2O_5$), Hf or oxides thereof, Nb or oxides thereof, an indium tin oxide (ITO), Bi or oxides thereof (e.g., $Bi_2O_3$), Ce or oxides thereof, Pr or oxides thereof, Ni or oxides thereof, aluminum doped zinc oxide (AZO), or indium zinc oxide (IZO). In certain preferred aspects, the first antireflection layer 140 of the article is $WO_3$.

As further shown in FIGS. 2A-3B and as also detailed in FIG. 4 a first metal layer 150 adapted for infra-red reflection and electrically conductive film is directly deposited on the first antireflection layer 140 at a thickness ranging from 50 Å to 400 Å and more preferably ranges from 70 Å to 300 Å. The first metal layer 150 includes at least one of Ag, Au, Ag—Au, Cu, Al, Pd, Pt, Ni, Rd, or Zn. In certain preferred aspects, the first metal layer 150 is Ag.

As further shown in FIGS. 2A-3B and as further detailed in FIG. 4, the second antireflection layer 160 is directly deposited on the metal layer adapted for infra-red reflection at a thickness ranging from 100 Å to 1000 Å and more preferably ranges from 200 Å to 600 Å. The second antireflection layer 160 includes at least one of W or oxides thereof (e.g., $WO_3$), Sn or oxides thereof (e.g., $SnO_2$), Zn or oxides thereof (e.g., ZnO), Ti or oxides (e.g., $TiO_2$) or nitrides thereof, Al or oxides thereof, Ta or oxides thereof (e.g., $Ta_2O_5$), Hf or oxides thereof, Nb or oxides thereof, an indium tin oxide (ITO), Bi or oxides thereof (e.g., $Bi_2O_3$), Ce or oxides thereof, Pr or oxides thereof, Ni or oxides thereof, aluminum doped zinc oxide (AZO), or indium zinc oxide (IZO). In certain preferred aspects, the second antireflection layer 160 of the article is W and/or $WO_3$. In certain preferred aspects, the second antireflection layer 160 of the article is $WO_3$.

Figure 6:
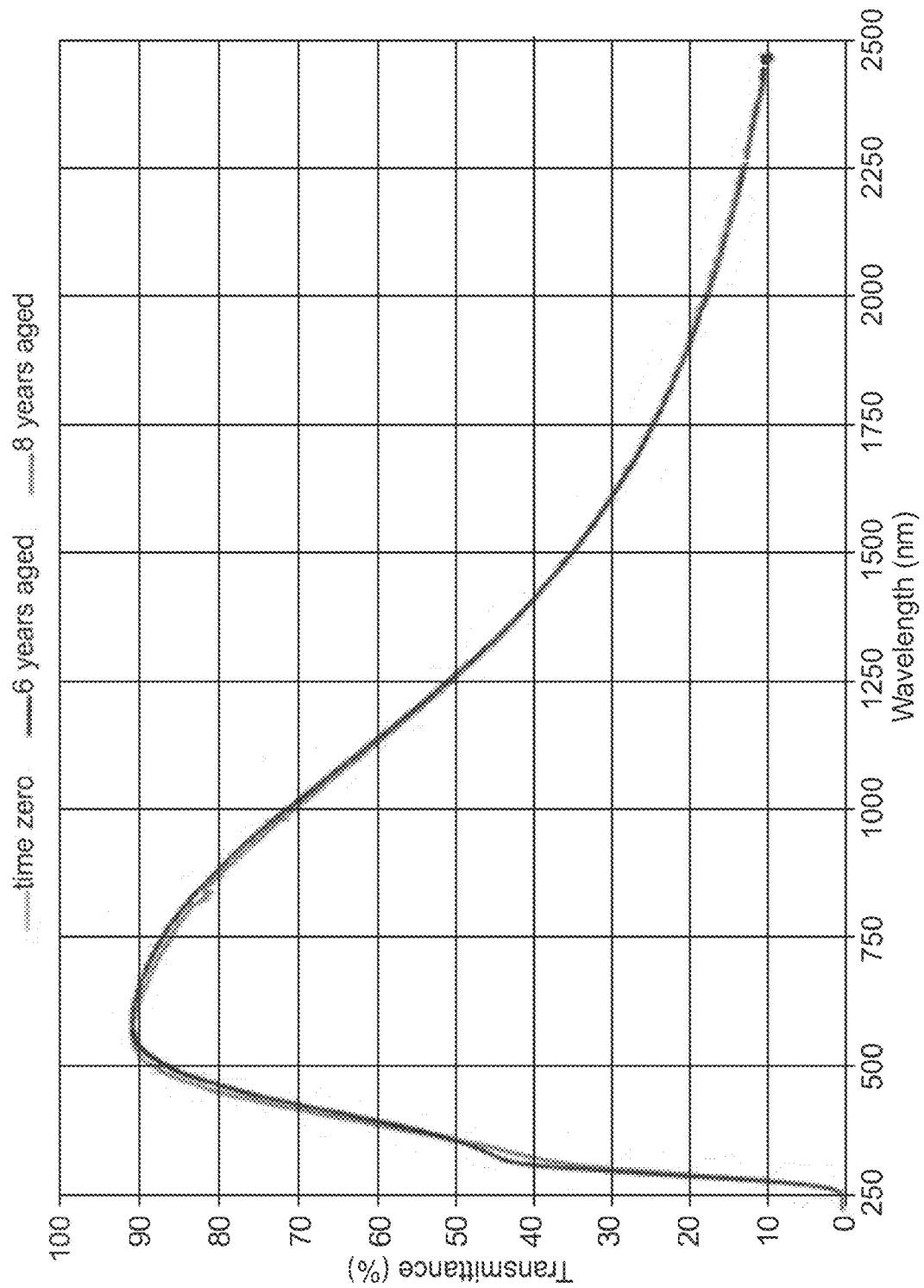
FIG. 6 is a graph demonstrating environmental stability and durability of the disclosed transparent articles (i) immediately after making the article(s), (ii) after aging the article(s) for 6 years, and (iii) after aging the article(s) for 8.5 years respectively at ambient humidity and room temperature.

In certain aspects and when the first and/or second metal layers 150 are silver (Ag) in the disclosed transparent articles, the metal surface to dielectric layer (antireflection layer) contact interface is very important because if electron scattering is lost and/or reduced at the metal surface/dielectric layer interface undesirable, extra interface resistance results, which renders the transparent articles considerably less effective for their desired purposes. In certain preferred aspects and when the first and/or second metal layers 150 are silver (Ag) in the disclosed transparent articles, W and/or $WO_3$ makes excellent, smooth contact with the silver layer, which provides long term environmental and thermal stability/longevity of the transparent articles while concurrently avoiding the undesirable effects (e.g., extra interface resistance, decreased electron scattering etc.) discussed above. To further evidence this fact, FIG. 6 shows long term environmental stability of the exemplary transparent articles disclosed herein. In these aspects, $WO_3$ is particularly preferred because of its high refractive index. For example, in the visible region, its refractive index is 2.2, which allows for very thin layers to be deposited that still provide for antireflection. Furthermore W and $WO_3$ have high sputtering rates, and can be advantageously deposited on the pure metallic target/metal layer (e.g., a silver (Ag) layer) with little or no metal target erosion thereby quickly and efficiently forming a hard durable coating over the metal layer and further forming a hard, durable transparent article. For the transparent articles disclosed herein, W and $WO_3$ are also particularly preferred for the transparent articles disclosed herein for at least the advantages discussed above especially when compared with other common oxides used as antireflection coating(s) (also referred to as "AR coating(s)") in Low-e systems, For example, when ZnO is used as an antireflection layer, ZnO has a yellow residual color formed soft films, effected by UV radiation(s) and can further exhibit arching problems.

As shown in Table 1 below, the presence of W and/or $WO_3$ (as an antireflection layer) in the transparent article(s) is dependent on the deposition process utilized to produce the transparent article. The two different deposition processes used in Table 1 are e-beam deposition and sputtering deposition. With regard to e-beam deposition, e-Beam deposition is a thermal evaporation process that heats a source material by a focused e-beam and evaporates the source material from a solid phase to gas phase (gas form) wherein the gas form of source material condenses on the substrate surface or another previously deposited layer thereby forming a thin film layer of source material. One skilled in the art understands that e-beam deposition is how one deposits an oxide layer from an oxide source. In certain aspects and for Reactive evaporation one can use metal source (e.g., W) and evaporate the metal source (e.g., W) in a reactive gas environment, e.g., oxygen environment and the resulting film will be oxide of source material (e.g., $WO_3$ formed from deposited W that is subsequently oxidized in the reactive gas environment). For example, if e-beam deposition is utilized when depositing the second antireflection layer, then the second antireflection layer may be exclusively $WO_3$. In the sputtering deposition either DC or RF sputtering a metal target, for example a metal target of the antireflection layer such as W, is used as a source material. In a vacuum environment and the metal surface of the metal target, for example a metal target of the antireflection layer such as W, is bombarded by an Ar-reactive gas mixture (Oxygen for oxides). Ar sputters metal particles from target surface and oxygen reacts with the metal to form a metal oxide film (e.g., $WO_3$ formed from deposited W that is subsequently oxidized in the reactive gas environment as shown in Table 1) deposited over, for example, the metal layer(s) 150 disclose herein. However, if sputter deposition is utilized to deposit the second antireflection layers, desired antireflective material (e.g., W, Sn, Zn, Ti, Al, Ta, Hf, Nb, Bi, Ce, Pr, Ni) may be first deposited over the metal layer 140, and post-deposition, the desired antireflective material may be treated (e.g., introducing $Ar/O_2$mixture into the chamber thereby oxidizing and transforming the desired antireflective metal from an outermost surface inwardly towards the first metal layer 140 thereby forming the second antireflection layer without oxidizing the first metal layer 140. For example, in view of FIGS. 2A-3B and FIG. 4, W may be first deposited over the first metal layer 140, and post-deposition of W, oxygen ($O_2$) may be introduced into the chamber thereby oxidizing the second metal layer to form the second antireflection layer 160 without oxidizing the first metal layer.

As further shown in FIGS. 2A-3B, no buffer layer comprising Ni, Cr, Ti, Si, Ni—Cr, and/or oxides thereof is deposited between the first metal layer 150 and the second antireflection layer 160. By omitting the buffer layer (buffer layer comprising Ni, Cr, Ti, Si, Ni—Cr, and/or oxides thereof), the transparent articles disclosed herein advantageously achieves very long shelf life (FIG. 6) and environmental and temperature stability/durability when compared to all other currently known silver based low-e coatings that have buffer layers (buffer layer comprising Ni, Cr, Ti, Si, Ni—Cr, and/or oxides thereof) between metal and antireflective layers.

In certain aspects, the articles 100, 200 depicted in FIG. 2A and FIG. 2B may have an outermost protective transparent layer 170 deposited on the second antireflection layer 160 at a thickness ranging from 100 Å to 10,000 Å and more preferably from 600 Å to 10,000 Å. For example, the articles 100, 200 depicted in FIG. 2A and FIG. 2B correspond to articles 300, 400 depicted in FIGS. 3A and 3B, which have an outermost protective transparent layer 170. When the outermost protective transparent layer is present in the article(s), the outermost protective transparent layer may include/be formed from a poly(p-xylylene) outer coating (e.g., parylene C). In certain aspects, the outermost protective transparent layer 170 does not affect reflectance, transmissivity, and/or low emissivity of the transparent articles but merely serves as a protective coating to further enhance durability of the disclosed articles as shown, for example, in FIG. 6, which demonstrate environmental stability and durability of the disclosed transparent articles (i) immediately after making the article(s), (ii) after aging the article(s) for 6 years, and (iii) after aging the article(s) for 8.5 years respectively at ambient humidity and room temperature.

Figure 5A:
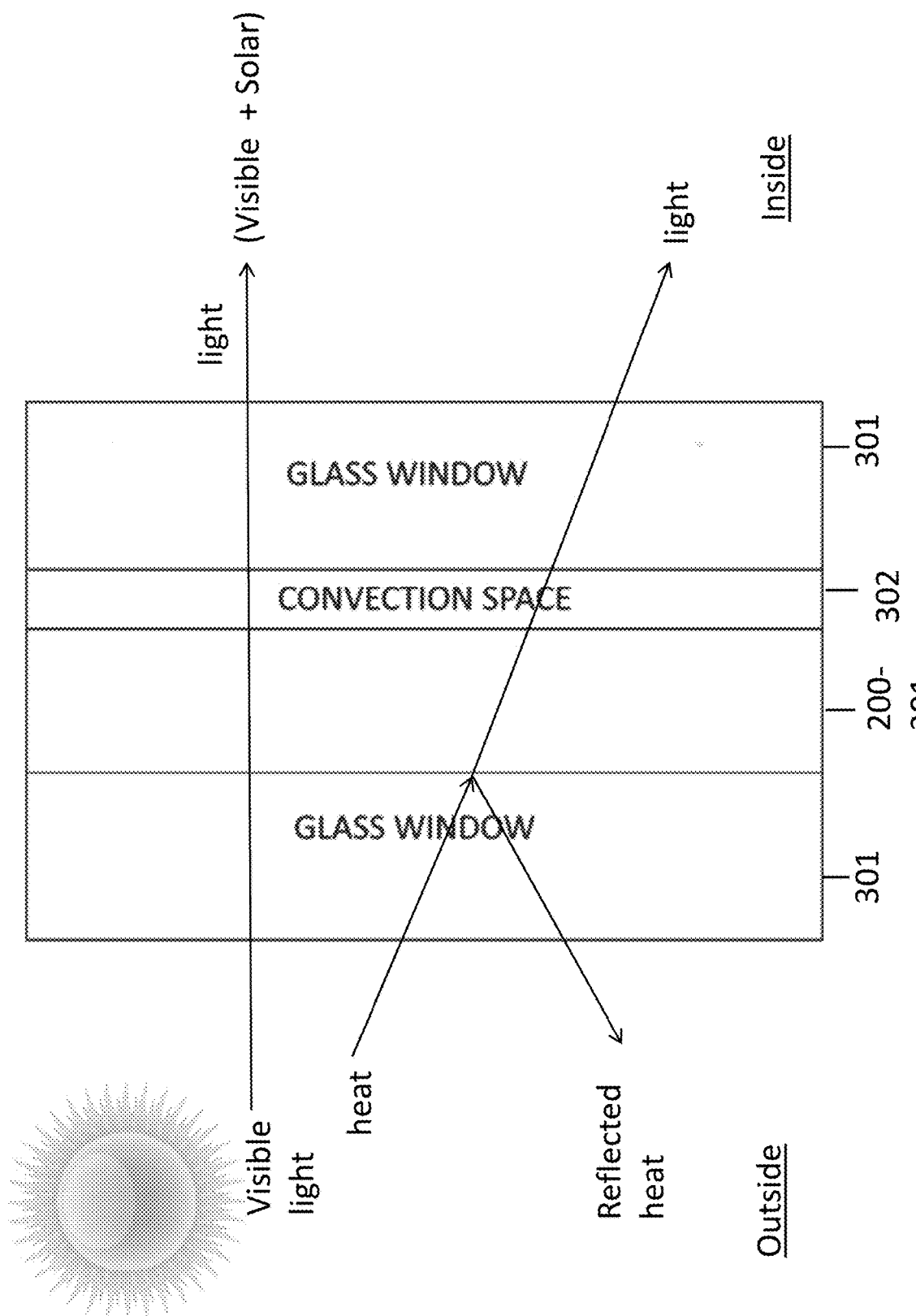
FIG. 5A schematically depicts the functionality of an insulated glass unit (IGU) according to one embodiment having the disclosed transparent articles positioned between internal surfaces of two glass panes (glass window) and contacted with visible light and infrared wavelengths.
Figure 5B:
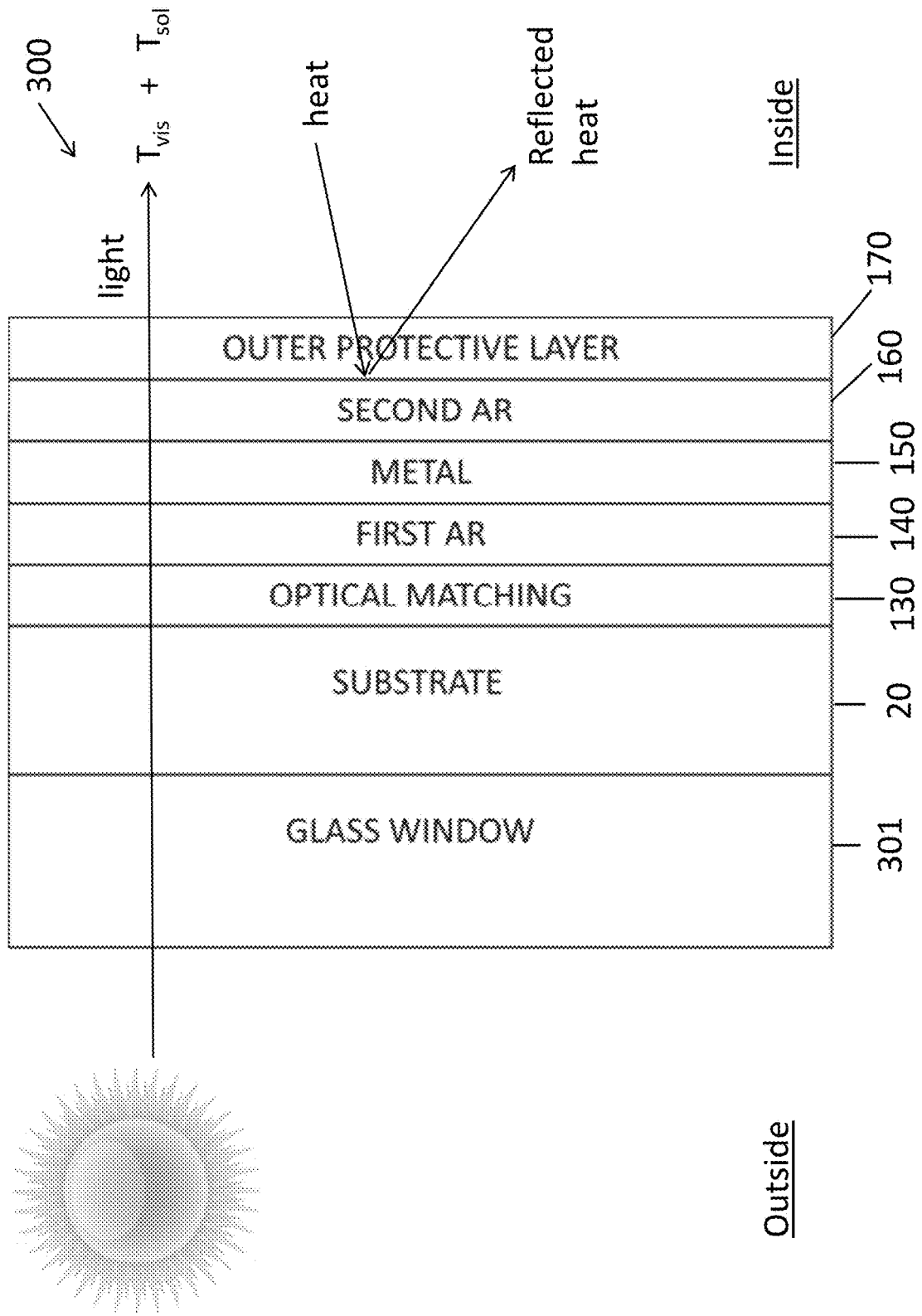
FIG. 5B schematically depicts the functionality of another embodiment where a transparent article is attached to a single glass pane (glass window) and contacted with visible light and infrared wavelengths.
Figure 7A:
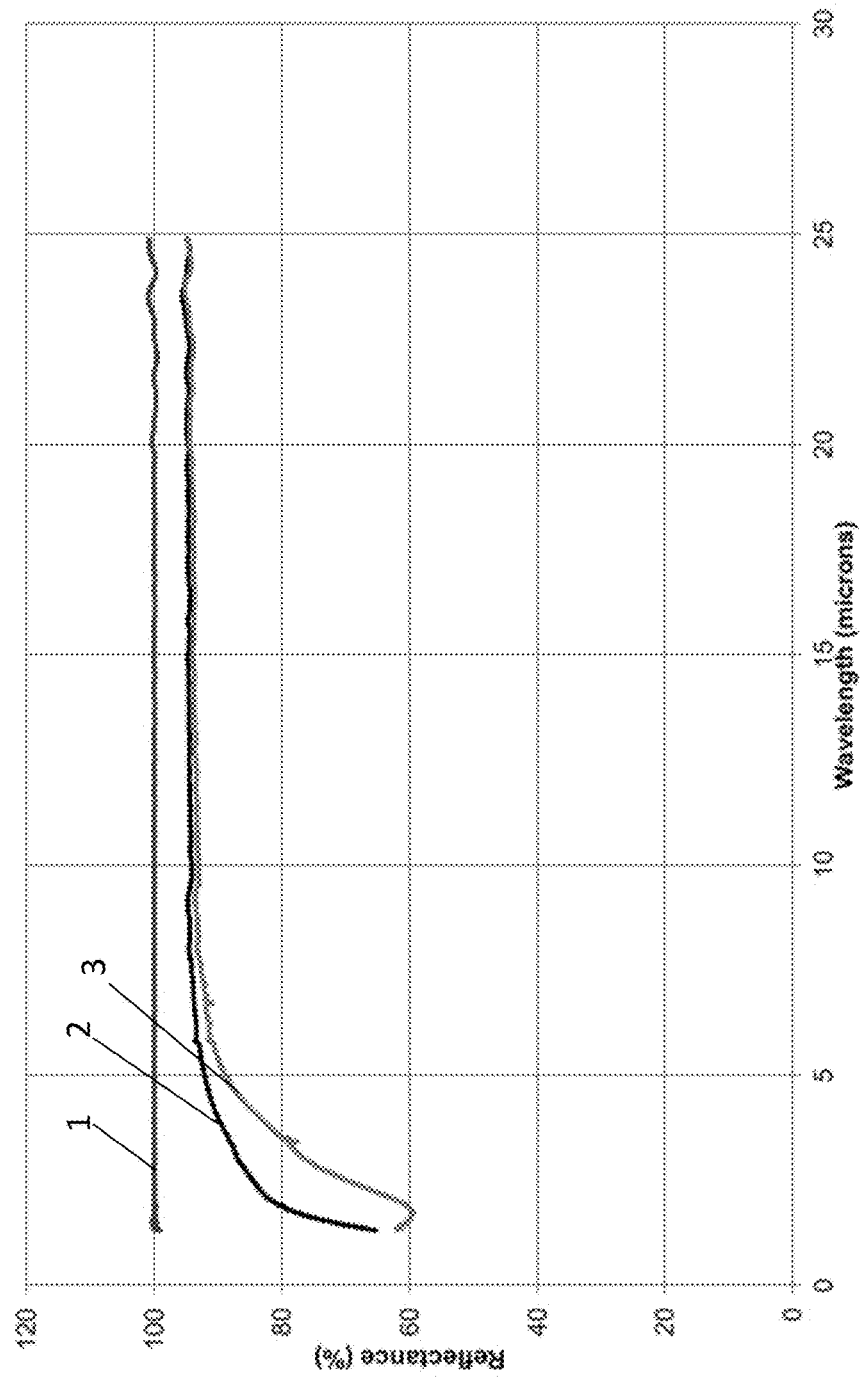
FIG. 7A is a graph depicting the heat region transparency of the protective coating (i) including a control expressed as 100% reflectance in the Figure legend and (ii) FTIR reflectance spectra for thin films disclosed herein deposited on a Melinex® substrate (polyester substrate) that either include or omit the outermost protective transparent layer in the 0.38 μm to 25.0 μm region.
Figure 7B:
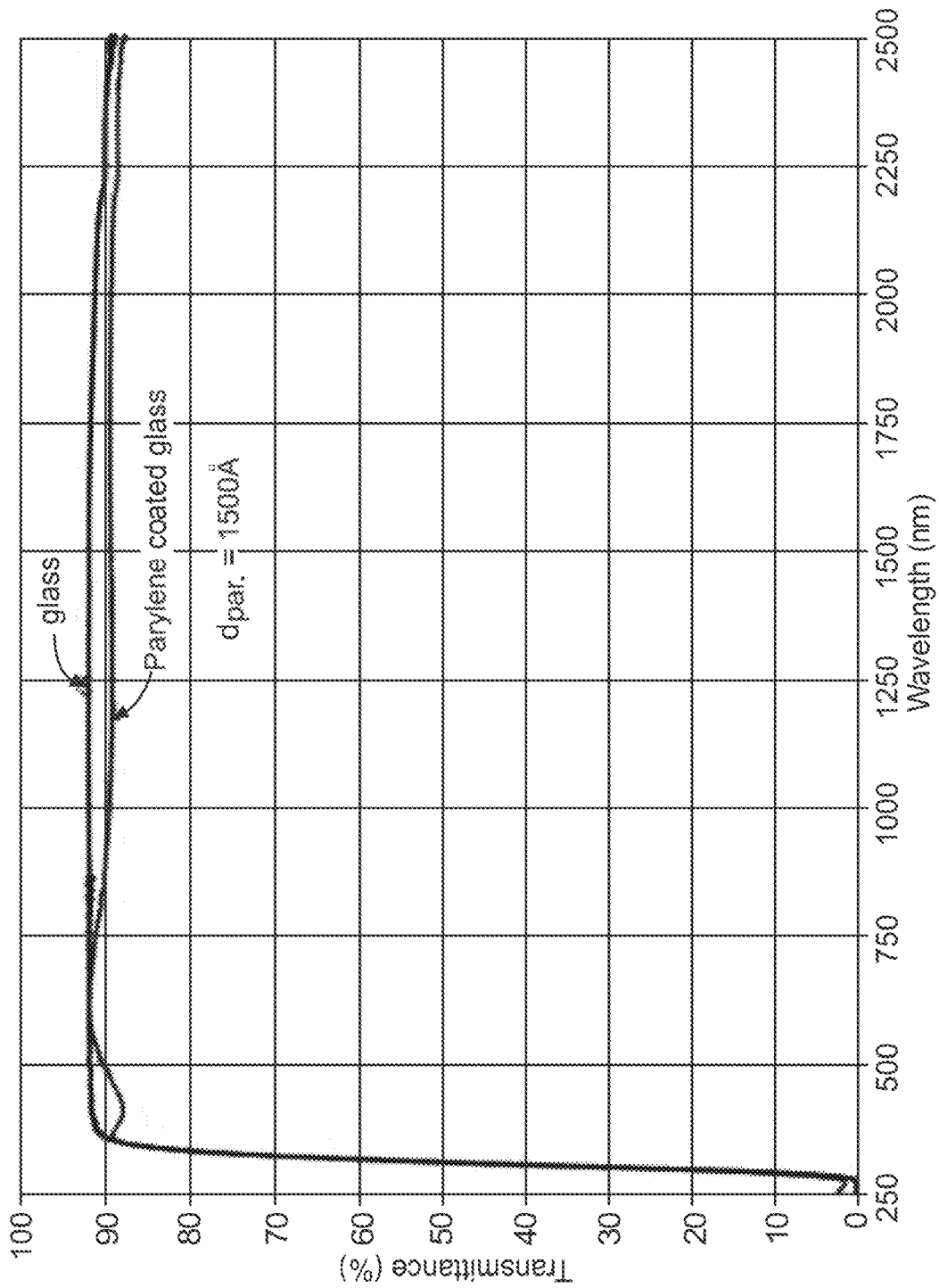
FIG. 7B is a graph depicting the visible and solar region transparency of outermost transparent coating deposited on glass in the 0.38 μm to 25.0 μm region.

In view of FIG. 5B and when the transparent article is applied to, for example, a glass window (or window pane), the outer protective layer may further protect the second antireflection layer from smudging (e.g., from residual oils left on the article surface) when contacted with human skin. For example, if no outer protective layer were included on the transparent article shown in FIG. 5B and the article was subsequently contacted with human skin, irremovable smudging could result, which would eventually degrade the outermost antireflection layer 160 (e.g., second antireflection layer or fourth antireflection layer) that is not coated with the outer protective transparent layer 170. In certain preferred aspects, the outer protective transparent layer 170 is a washable and blow dryable, water repellant, hydrophobic, and chemically resistant coating that can withstand nearly all cleaning solutions. Regarding the outer protective transparent layer 170, FIG. 7A further shows heat region infrared reflectance of an exemplary transparent article with and without the outer transparent protective layer 170. As shown in FIG. 7A, both the transparent article including and omitting the outer transparent protective layer have nearly the same reflectance value indicating that outer protective layer 170 advantageously has nearly no absorption in this spectral region. FIG. 7B further shows that the outer protective transparent layer 170 is transparent in the visible region, and more specifically shows spectral transmittance of a glass substrate with and without the outer transparent protective layer 170. Thus, because the outer protective layer protects underlying layers (e.g., antireflection and metal layers) and has little effect on reflectance and transmittance when compared to identical articles that omit this protective layer, including the outer protective layer is beneficial in certain transparent article embodiments.

In certain aspects and as further shown in FIGS. 2C, 2D, and 4, transparent articles 101, 201 having double low-emissivity thin films may also be desired. Low-e coating(s) are special transmission-reflection filters having high visible transmission, especially when coated on glass window(s), and high reflection/rejection in the infrared region. In order to enhance/improve low-e performance, another Low-e may be added, which are called double Low-e, or super Low-e. For example and as shown in FIG. 4 double low-emissivity thin films may be formed by providing the articles 100, 200 shown, for example, in FIGS. 2A and 2B and then repeating steps S3-S5 of FIG. 4 to form the third antireflection layer, second metal layer, and fourth antireflection layer. The third antireflection layer substantially corresponds in thickness to the first antireflection layer 140 and is preferably made from the same material (e.g., at least one of W or oxides thereof (e.g., $WO_3$), Sn or oxides thereof (e.g., $SnO_2$), Zn or oxides thereof (e.g., ZnO), Ti or oxides (e.g., $TiO_2$) or nitrides thereof, Al or oxides thereof, Ta or oxides thereof (e.g., $Ta_2O_5$), Hf or oxides thereof, Nb or oxides thereof, an indium tin oxide (ITO), Bi or oxides thereof (e.g., $Bi_2O_3$), Ce or oxides thereof, Pr or oxides thereof, Ni or oxides thereof, aluminum doped zinc oxide (AZO), or indium zinc oxide (IZO)) as the first antireflection layer 140. Similar to the articles 100, 200 shown in FIGS. 2A and 2B, the articles 101, 201 having double low-emissivity thin films have a second metal layer deposited directly over the third antireflection layer. The second metal layer substantially corresponds in thickness to the first metal layer and is preferably made from the same material as the first metal layer 150 (e.g., at least one of Ag, Au, Ag—Au, Cu, Al, Pd, Pt, Ni, Rd, or Zn). As further shown in FIGS. 2C and 2D, a fourth antireflection layer is directly deposited over the second metal layer. The fourth antireflection layer substantially corresponds in thickness to the second antireflection layer 160 and is preferably made from the same material (e.g., at least one of W or oxides thereof (e.g., $WO_3$), Sn or oxides thereof (e.g., $SnO_2$), Zn or oxides thereof (e.g., ZnO), Ti or oxides (e.g., $TiO_2$) or nitrides thereof, Al or oxides thereof, Ta or oxides thereof (e.g., $Ta_2O_5$), Hf or oxides thereof, Nb or oxides thereof, an indium tin oxide (ITO), Bi or oxides thereof (e.g., $Bi_2O_3$), Ce or oxides thereof, Pr or oxides thereof, Ni or oxides thereof, aluminum doped zinc oxide (AZO), or indium zinc oxide (IZO)) as the second antireflection layer. Although not depicted in the Figures, the transparent articles 101, 201 having double low-emissivity may further include an outermost protective transparent layer 170 having substantially the same thickness and being made from substantially the same material as the outermost protective transparent layer 170 depicted in FIGS. 3A and 3B.

Figure 5C:
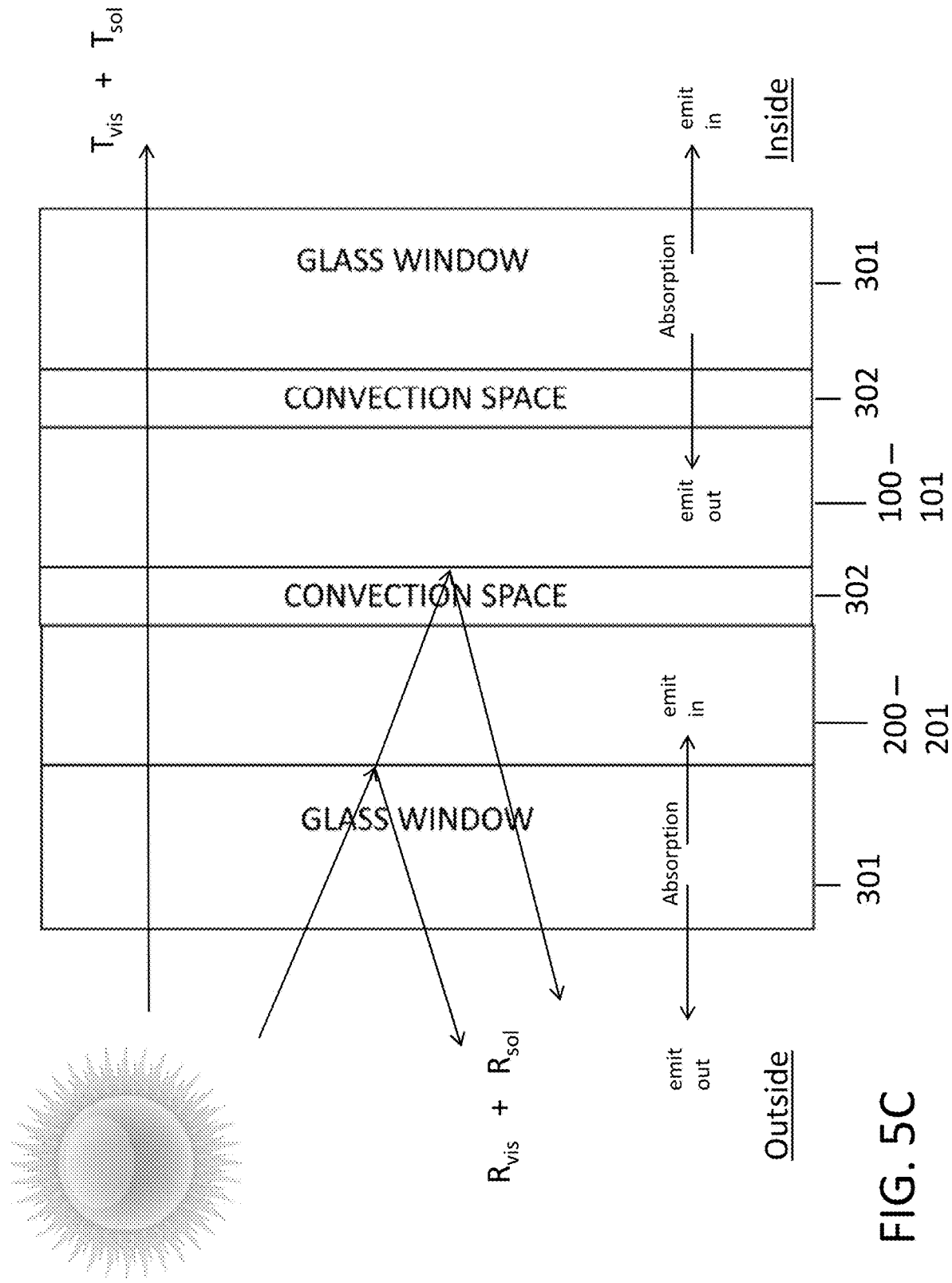
FIG. 5C schematically depicts a second insulated glass unit (IGU) having two transparent articles positioned between internal surfaces of two glass panes (glass windows) in which one transparent article is attached to a glass pane and a second transparent article is suspended between two convection spaces of the second IGU.
Figure 5D:
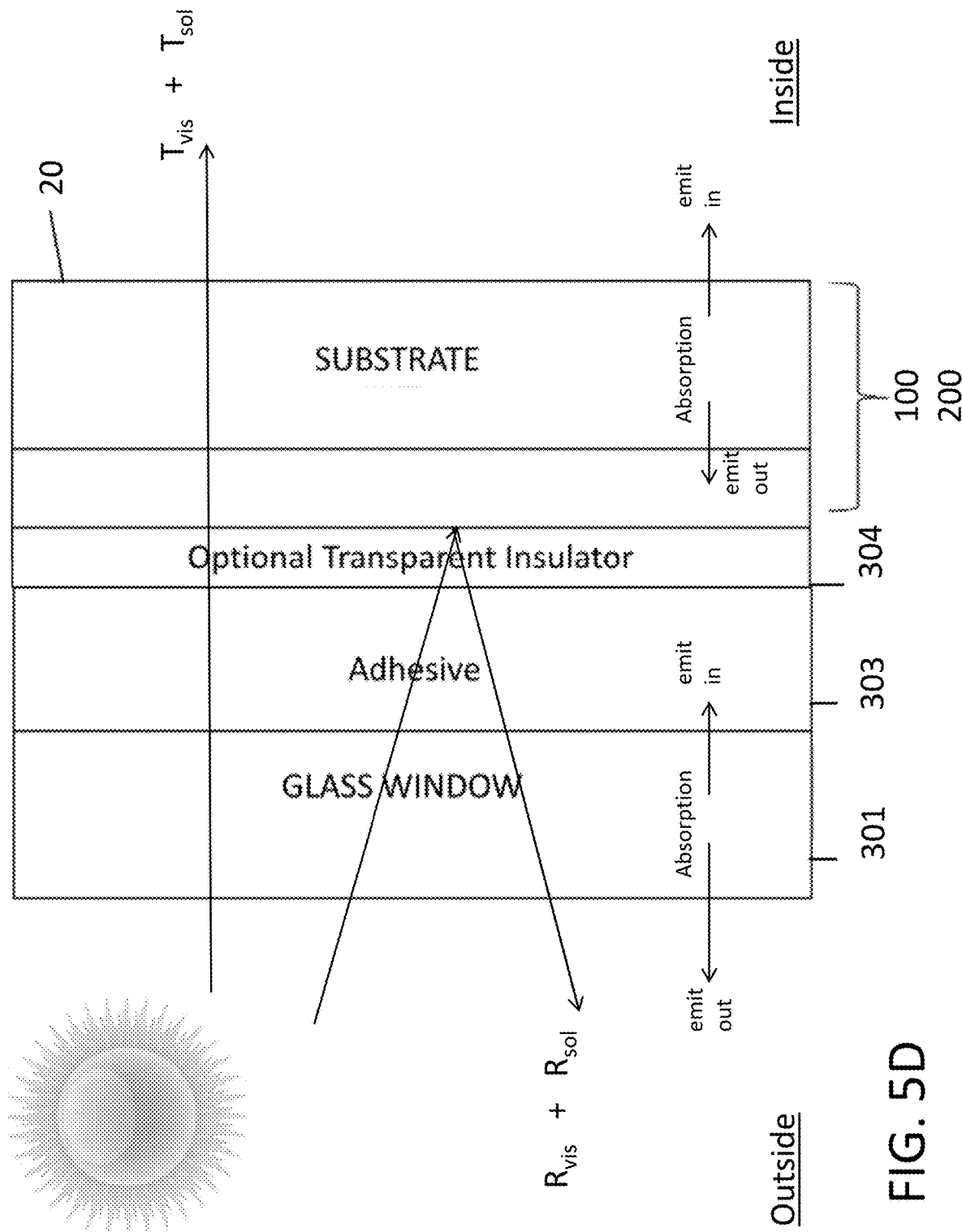
FIG. 5D schematically depicts another embodiment in which the transparent article is adhered to and retrofitted on an existing glass pane (glass window)
Figure 5E:
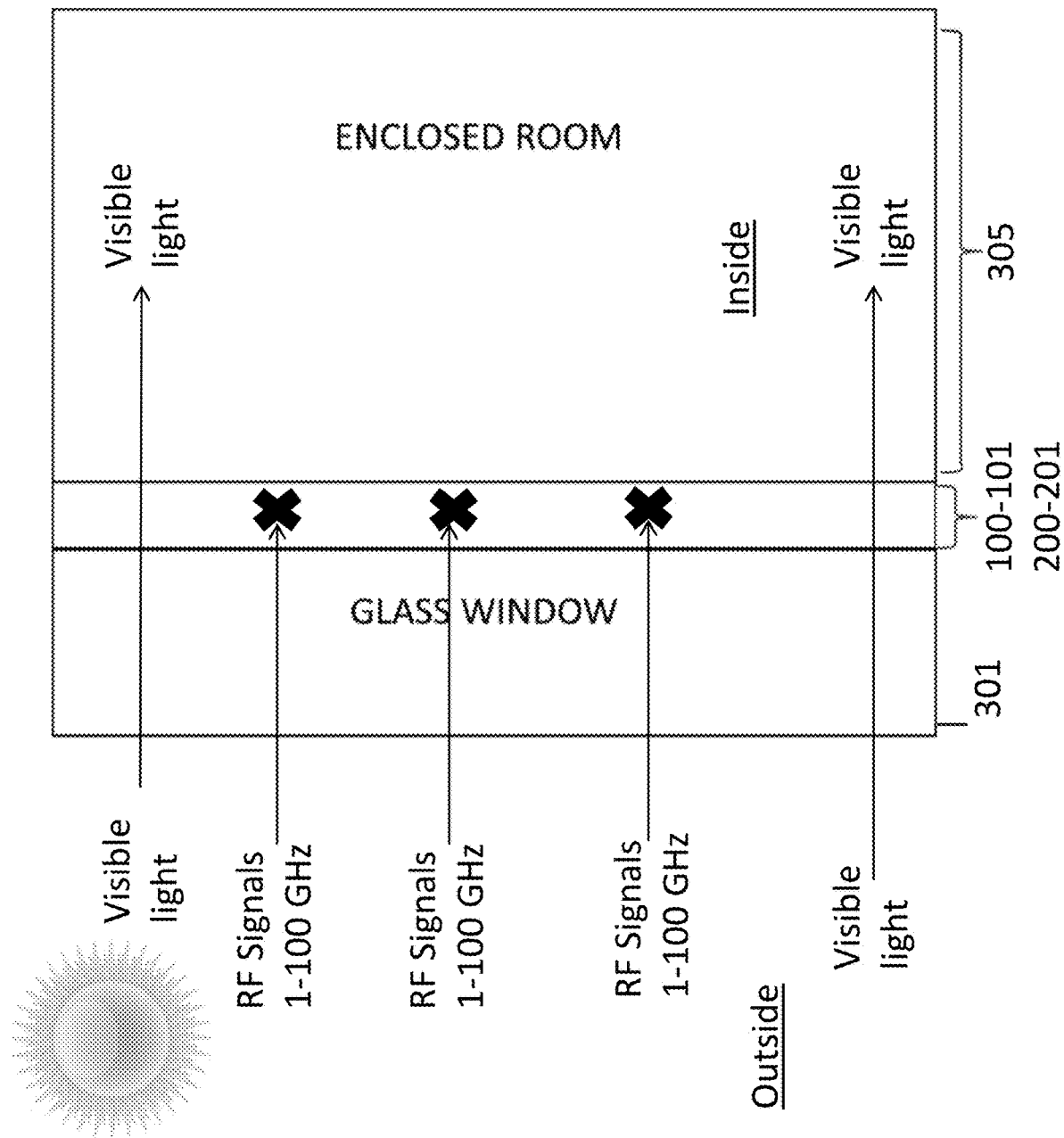
FIG. 5E schematically depicts the RF shielding functionality (also referred to as EMI shielding or EMI shielding properties) of the disclosed transparent articles for an enclosed room.

The transparent articles and thin films disclosed herein preferably exhibit the highest possible transparency (similar to no coating/film being deposited on the substrate) while concurrently exhibiting the lowest possible sheet resistance/highest possible conductivity, which directly affect heat rejection capability and shielding efficiency as shown, for example, in FIGS. 5A, 5B, and 5E. In certain aspects, the transparent articles 100, 200, 101, 201, 300, 400 made with the above disclosed methods have an optical transparency of at least 30% between a wavelength ranging from 380 nm to 780 nm and has at least 30% heat rejection at a wavelength ranging from 380 nm to 2200 nm. In certain aspects, an optical transparency of at least 40%, at least 50% or at least 60% between a wavelength ranging from 380 nm to 780 nm and has at least 40%, at least 50%, or at least 60% of total solar reflectance of heat rejection at a wavelength ranging from 380 nm to 2200 nm.

In certain aspects, each disclosed transparent article 100, 200, 101, 201, 300, 400 further exhibits electromagnetic interference shielding properties. For example, FIG. 5E schematically a glass window 301 having at least one transparent article (100, 101, 200, 201) attached thereto/positioned thereon. The glass window 301 of FIG. 5E is an outer surface of an enclosed room 305 and is adapted to pass visible light from outside to inside the enclosed room while concurrently shielding RF. In certain aspects, film/transparent article is positioned between the glass 301 and substrate 20, with the substrate 20 being the inner most surface relative to the interior of the enclosed room 305. Specifically, FIG. 5E depicts RF (radio frequency) shielding functionality (also referred to as EMI shielding or EMI shielding properties) of the disclosed transparent articles for an enclosed room, and Table 2 below further shows shielding efficiency ("SE") for exemplary samples of the transparent articles disclosed herein. In preferred aspects, the transparent articles achieve a shielding attenuation of from −10 dB to −45 dB at a frequency of 1 GHz to 100 GHz. Thus, in view of these electromagnetic interference shielding properties and when applied to for example a glass window as shown in FIGS. 5A-5E, the transparent article(s) may act as an electromagnetic shield as specific frequencies.

In certain aspects, the article has an electrical sheet resistance ranging from 1 to 120 Ohm/sq. In certain aspects the article has an electrical sheet resistance ranging from 1 to 80 Ohm/sq, 1 to 50 Ohm/sq, or 4 to 25 Ohm/sq depending on the application of the coated transparent articles. For example, in certain aspects the article has an electrical sheet resistance ranging from 1 to 20 Ohm/sq for RF shielding transparent windows, 2 to 50 Ohm/sq, for Low-e windows, or 2 to 50 Ohm/sq. for transparent electrodes In certain aspects, each layer (optical matching layer if present, each antireflection layer, each metal layer(s), and outermost protective transparent layer if present) is deposited uniformly throughout the disclosed transparent articles thereby achieving uniform reflectance, transmissivity, low emissivity, and/or durability throughout the entire article.

Figure 10:
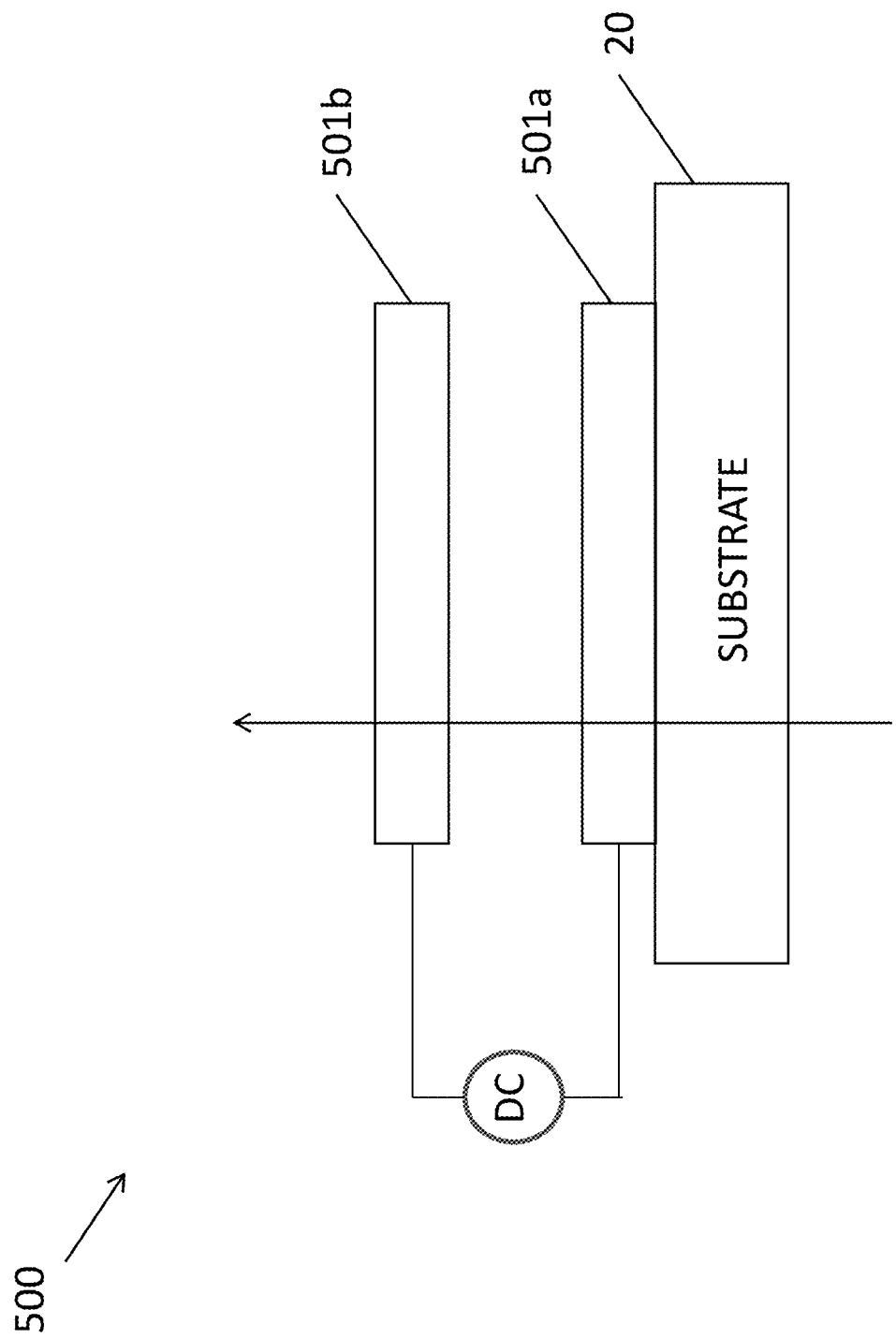
FIG. 10 provides a schematic depiction of an electrochromic device used to study transmission with the exemplary articles and thin films disclosed herein.

Various embodiments of the invention may have optical visible applications including, for example: low-e films for heat wave rejection (FIGS. 2A, 2B, 3A, 3B), double low-e films for heat wave rejection (FIGS. 2C and 2D), insulated glass units (e.g., FIGS. 5A and 5C), electrodes for displays (FIG. 10), and optical IR applications, and is also applicable to electrical applications, including electric field applications, such as to displays and electron interaction, for example, with regard to electro-chromic devices and photovoltaics, and transparent electronics. The invention provides a flexible transparent conductor for displays, for example, or a heat mirror type plastic insert or direct deposit on glass for windows in architectural or automotive applications. The invention can also comprise a transparent electrode for IR devices, and may be used in solar panels, spacecraft or satellite thermal control variable emittance systems, and on spacecraft surfaces as a protective coating for electrical charging. In view of the above generally disclosed applications and as shown in FIG. 5B, the transparent article(s) in certain aspects is adapted for adhering to a glass window and/or for retrofitting onto a glass window. As alluded above, these articles preferably exhibit anti-solar, low emissivity, electrically conductive properties, and/or electromagnetic shielding properties. For example, FIG. 5B shows an exemplary article adhered to a glass window and having high transmissivity of sunlight from outdoors while concurrently trapping/maintaining heat (e.g., infrared) inside. FIGS. 5A, 5C, and 5D further depict variations of the basic concept shown in FIG. 5B. For example, FIG. 5A depicts the functionality of an insulated glass unit (IGU) according to one embodiment having the disclosed transparent articles (200, 201 as shown but may also include 100 or 101) positioned between internal surfaces of two glass panes 301 (glass window) and a convection space 302 being contacted with visible light and infrared wavelengths. FIG. 5C depicts a second insulated glass unit (IGU) having two transparent articles (e.g., any combination of 100, 101, 200, 201) positioned between internal surfaces of two glass panes 301 (glass windows) in which one transparent article is attached to a glass pane and a second transparent article is suspended between two convection spaces 302 of the second IGU. FIG. 5D depicts another embodiment in which the transparent article (100, 200) is adhered with an adhesive to/retrofitted on an existing glass pane 301(glass window), and as further shown, the embodiment of FIG. 5D may further include a transparent insulator 304. In certain aspects and as further shown in FIG. 5E, the transparent articles exhibit electromagnetic interference shielding properties that act as an electromagnetic shield as specific frequencies. In certain aspects and as further shown in FIG. 10, the articles disclosed herein 501a, 501b (which each independently include one of 100, 101, 200, 201, 300, 400) may be included in an electrochromic device 500. Those skilled in the art will appreciate that many other applications of the invention are possible.

Figure 7C:
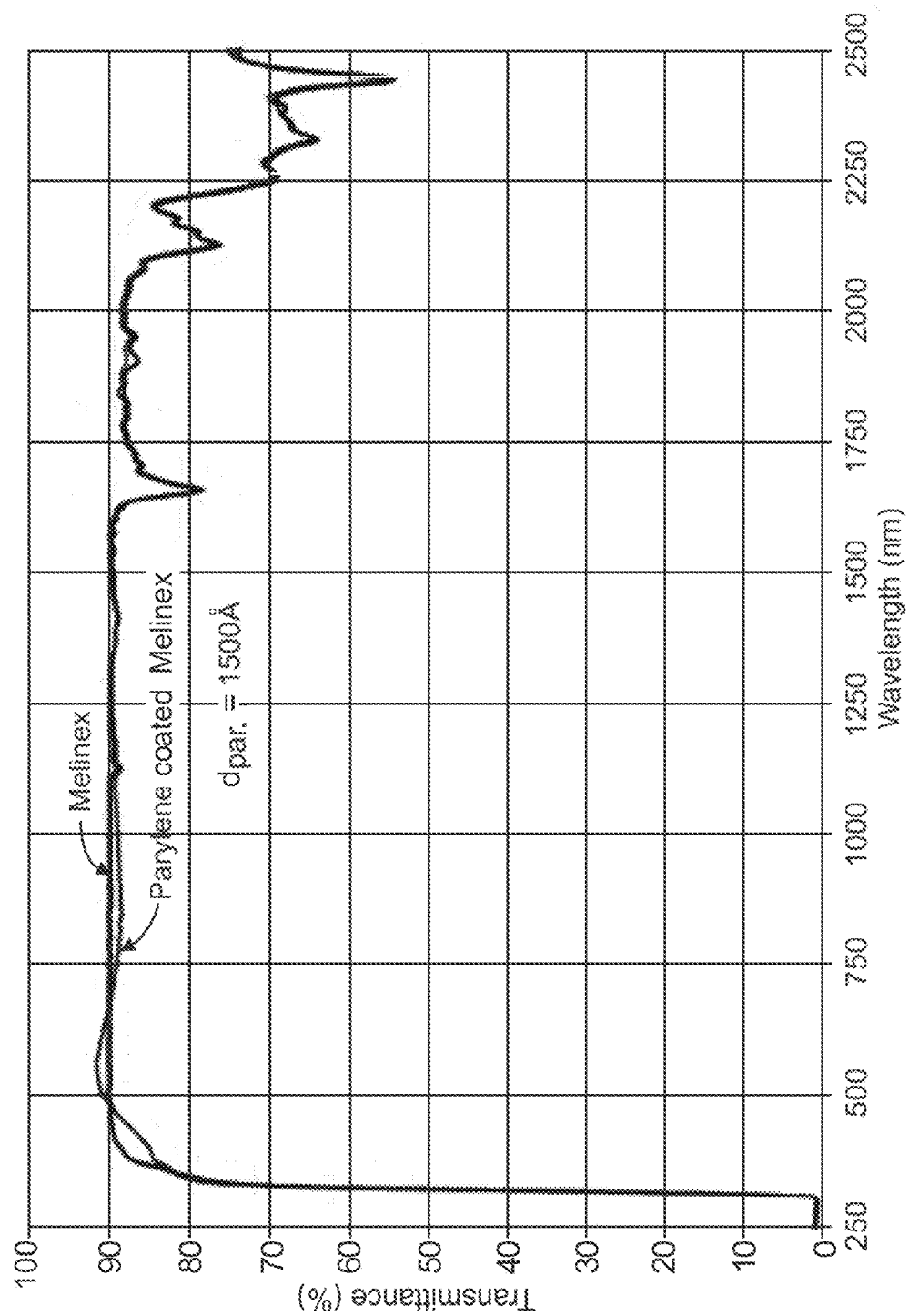
FIG. 7C is a graph depicting the visible transmittance spectra of the transparent articles disclosed herein that are deposited on a Melinex® substrate or omit the outermost protective transparent layer in the 0.38 μm to 25.0 μm region.

It should be further noted that FIG. 7C FIG. 7C is a graph depicting the visible transmittance spectra of the transparent articles disclosed herein that are deposited on a Melinex® substrate (polyester substrate) that either include (defined as "PAR. on Melinex" in this Figure) or omit (defined as "Melinex" in this Figure) the outermost protective transparent layer in the 0.38 µm to 25.0 µm region.

Figure 8A:
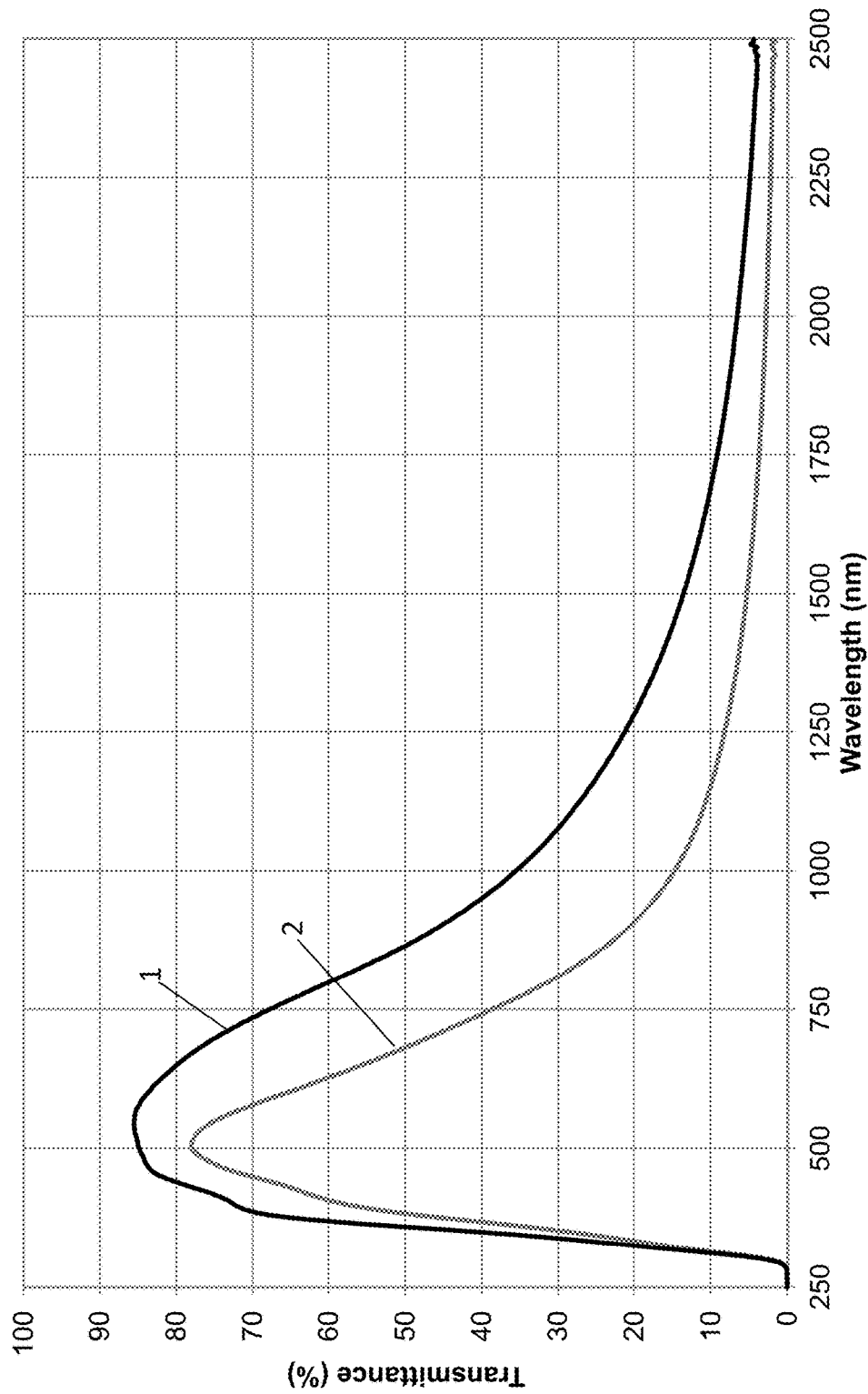
FIG. 8A is a graph depicting visible transmittance spectra of transparent articles that either include or omit the outermost protective transparent layer.
Figure 8B:
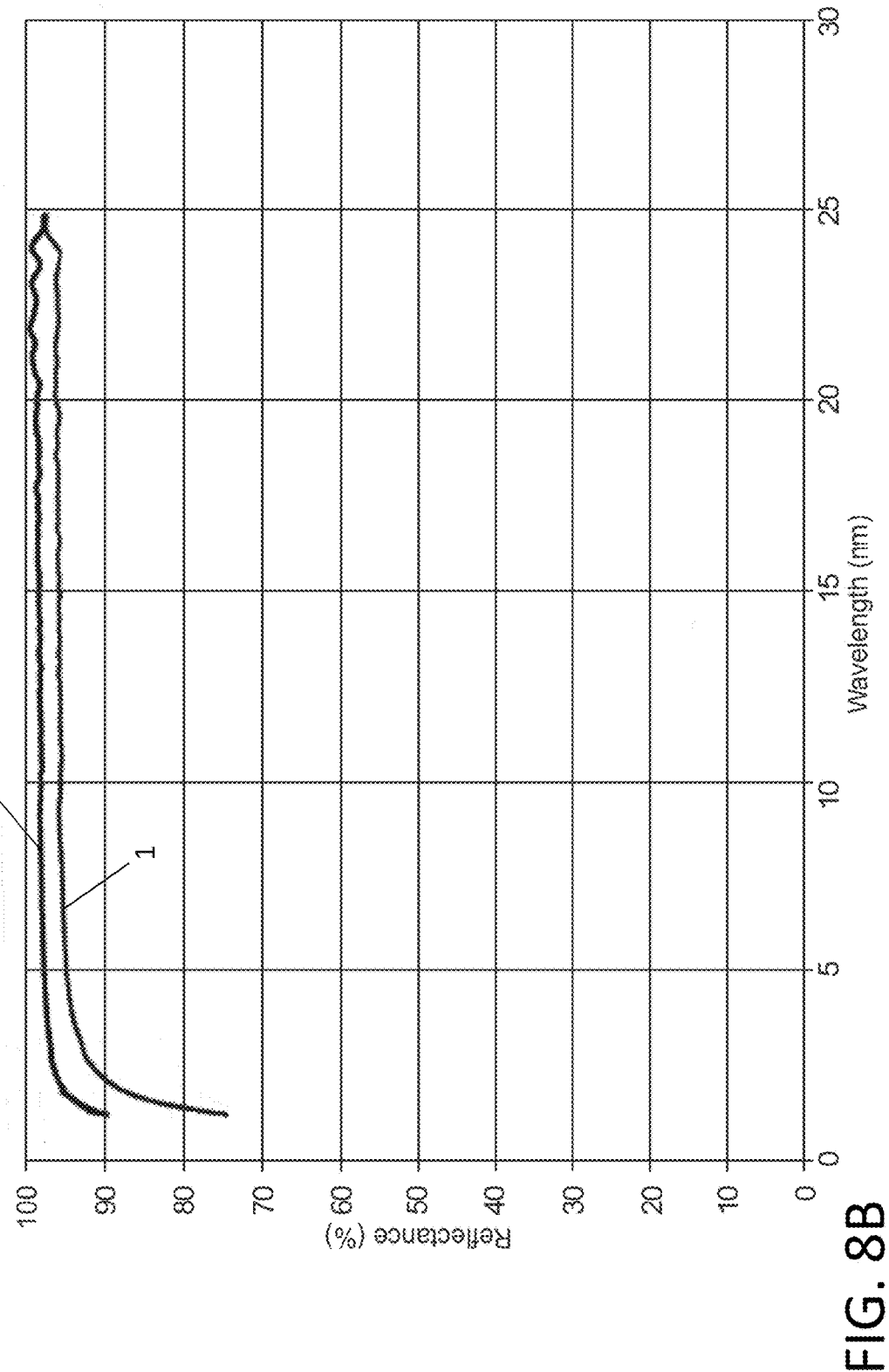
FIG. 8B is a graph depicting visible transmittance in the heat region Reflectance spectra of transparent articles of the samples from FIG. 8A that either include or omit the outermost protective transparent layer.

It should be further noted that FIG. 8A FIG. 8A is a graph depicting visible transmittance spectra of transparent articles that either include or omit the outermost protective transparent layer, and FIG. 8B is a graph depicting visible transmittance in the heat region Reflectance spectra of transparent articles that either include or omit the outermost protective transparent layer.

Figure 9A:
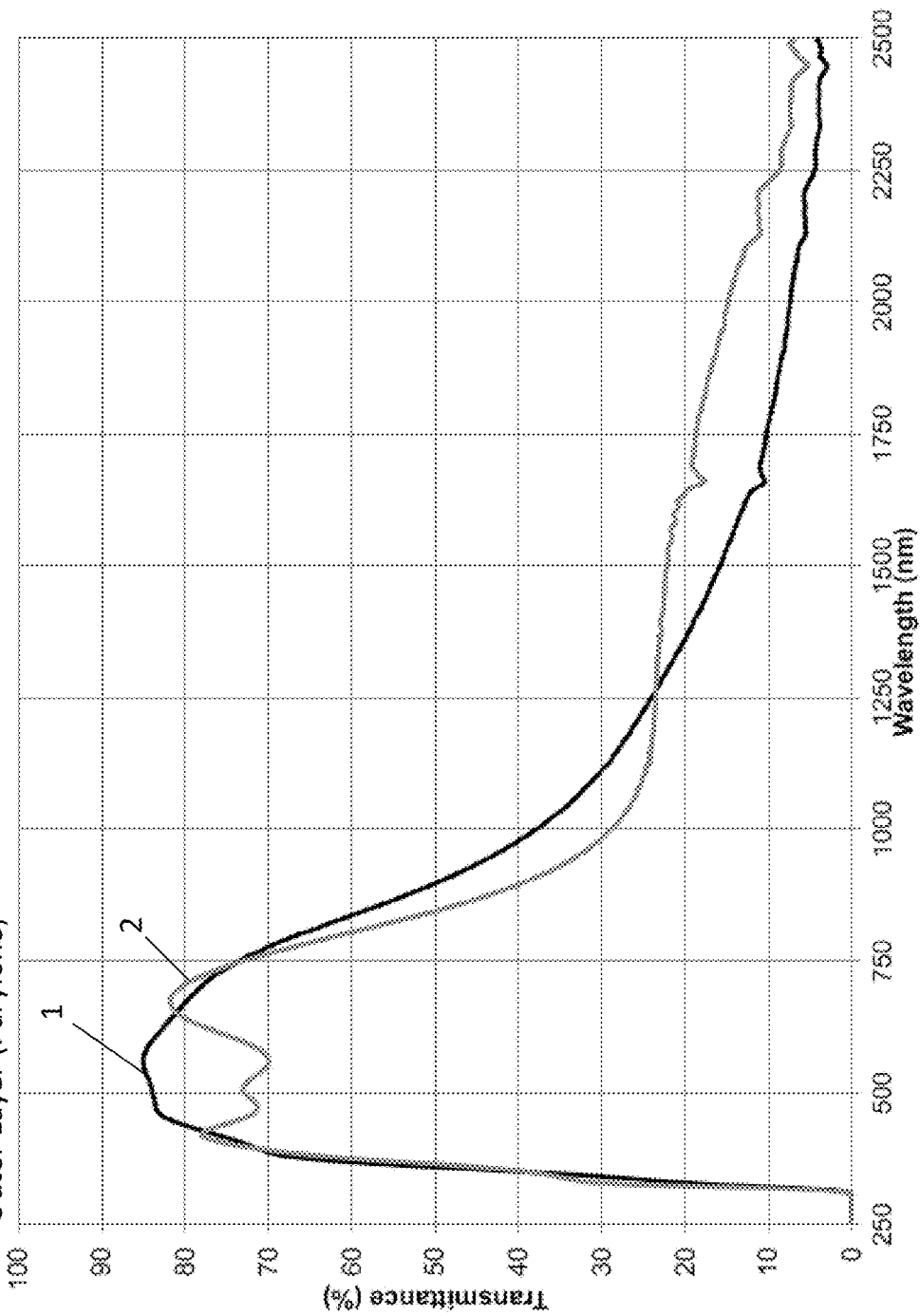
FIG. 9A is a graph depicting visible transmittance spectra for thin films disclosed herein deposited on a Melinex® substrate (polyester substrate) that either include) or omit the outermost protective transparent layer.
Figure 9B:
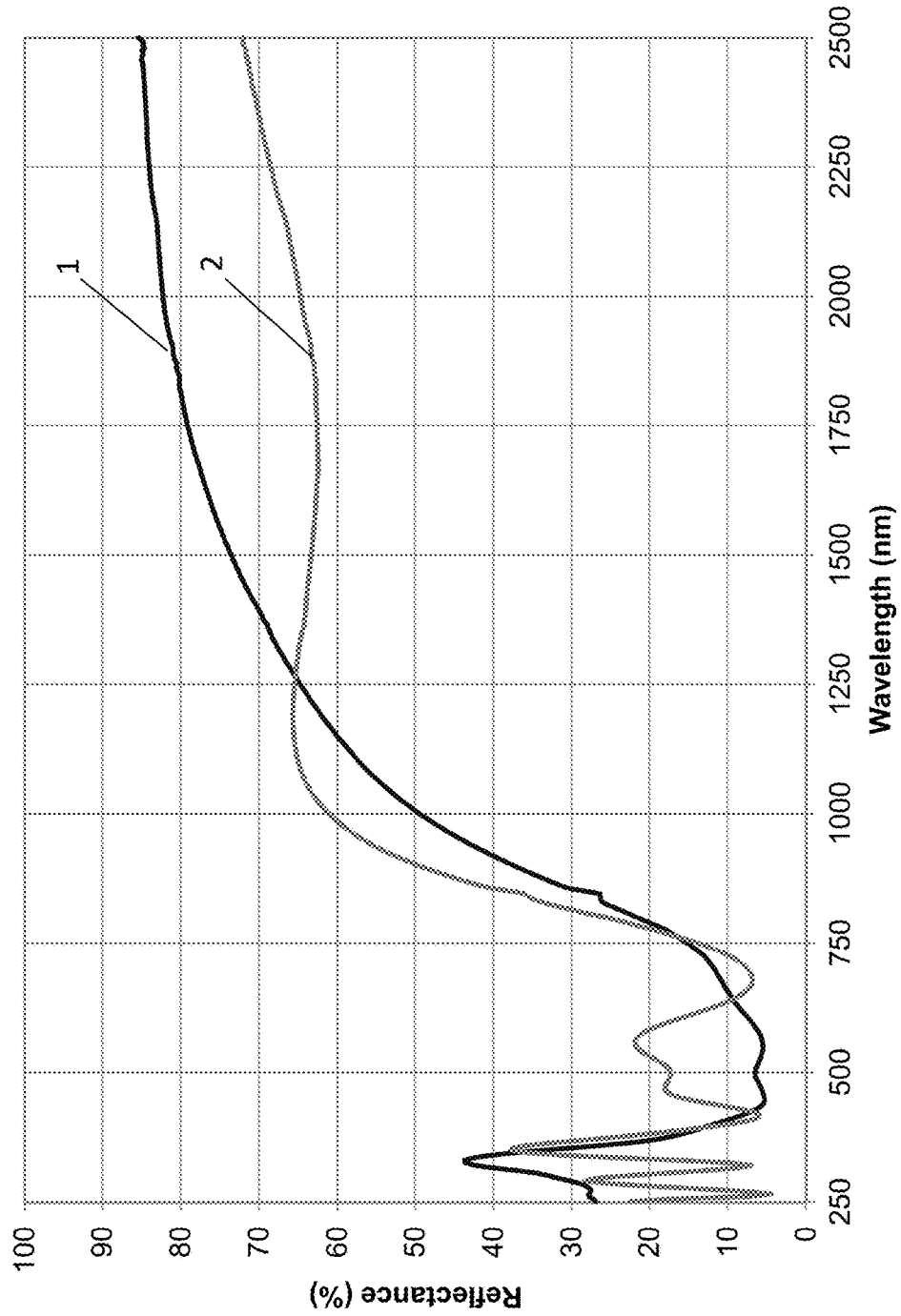
FIG. 9B is a graph depicting Reflectance spectra for thin films (as disclosed in FIG. 9A) deposited on a Melinex® substrate (polyester substrate) that either include or omit the outermost protective transparent layer.

It should be further noted that FIGS. 9A and 9B depicts depict visible transmittance spectra and reflectance or a thin films disclosed herein deposited on a Melinex® substrate (polyester substrate) that either include or omit the outermost protective transparent layer.

Those skilled in the art will also appreciate that many other processes, such as the use of a resistively heated source, or sputtering, could be used for the deposition. Moreover, different choices of the background pressure, substrate-to-source distance, deposition rate, and substrate temperature could be used. Inasmuch as the morphology of very thin films of the sort used in the present invention are dependent on deposition conditions, those skilled in the thin film arts will also appreciate that different deposition processes could be used to form multilayer films equivalent to those herein described, but that demonstrate the desired optical and electronic properties at somewhat different nominal values of film thickness.

Prior to making optical and electrical measurements on the deposited films described in the following examples, the adherence of each film to its substrate was assessed by a conventional cellophane tape stripping test. In all cases reported in the following examples the tape test showed excellent adhesion.

WORKING EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric.

Table 1 below depicts various articles envisioned to be made from the process and materials disclosed herein.

TABLE 1

| Deposition Type | Substrate | Optical Matching/Stress Releasing Layer ($SiO_2$) | First Antireflection Layer (Metal Oxide Layer) ($WO_3$) | Metal Layer (Ag) | Second Antireflection Metal Oxide ($WO_3$) | |
|---|---|---|---|---|---|---|
| | | | | | Layer | Metal (W) |
| E-Beam Deposition | Glass | No | Yes | Yes | NA | Yes |
| | Polymer (Polycarbonate) | Yes | Yes | Yes | NA | Yes |
| | Polyethylene Terephthalate Type | Yes | Yes | Yes | NA | Yes |
| | Fabric Type | Yes | Yes | Yes | | Yes |
| Sputter Deposition | Glass | No | Yes | Yes | Yes | Yes |
| | Polymer (Polycarbonate) | Yes | Yes | Yes | Yes | Yes |
| | Polyethylene Terephthalate Type | Yes | Yes | Yes | Yes | Yes |
| | Fabric Type | Yes | Yes | Yes | Yes | Yes |

Method of Making Transparent Articles:

Examples 1-4 are discussed further below including methods of making the transparent articles of Examples 1-3 and the properties exhibited by Examples 1-3 are further shown in Table 2 below. Generally, the examples were made by using multiple vacuum coaters having different deposition processes and vacuum conditions e.g., e-beam and sputtering processes for thin film of all inorganic coating materials and thermal chemical vapor deposition, thermal-CVD, for Parylene C films.

Prior to deposition each substrate was plasma cleaned in a vacuum by exposing the substrate to 30 sec to 2 min Ar bombardment. Next, each substrate of Examples 1-3 (as discussed further below and as further shown in Table 2) were deposited and formed by (i) e-beam directed deposition and (ii) a sputtering process.

For e-beam deposition, the oxide starting material (e.g., $SiO_2$ (optical matching, adhesion promoting, stress releasing layer), $WO_3$ (first antireflection layer), Ag (metal layer), and $WO_3$ (second antireflection layer)) was loaded in crucibles as well as the clean substrates were located in the deposition chamber, the chamber door was closed than system pump down to 10' Torr background pressure and e-beam was directed to crucibles subsequently deposited at rates of ranging from 2 to 30 Å/sec thereby forming Examples 1-3.

For the sputtering process a multi-region deposition environment was used e.g., a reactive sputtering technique from metallic targets of W were applied to deposit antireflective oxide coatings of $WO_3$ films using Ar-oxygen mixture of 1 to 10 $10^{-4}$ Torr (background pressure $10^{-5}$ Torr) of vacuum level and sputtering power was 0.2 to 5 Watts/cm$^2$, and deposition rates ranged from 1 to 10 Å/sec. $SiO_2$ was deposited from 5% boron doped Si target using RF reactive sputtering or e-beam process. Ag and W metallic films sputtered from pure Ag and W targets using only Ar as a sputtering gas.

Example 1: $WO_3/Ag/WO_3$ Films Formed By Different Deposition Techniques A. A $WO_3/Ag/WO_3$ Film Formed By E-Beam Deposition In this example, a clean 2-4 mm glass or 0.1 to 0.125 mm thick Melinex was used to deposit (via e-beam deposition) the $WO_3/Ag/WO_3$ and/or $SiO_2/WO_3/Ag/WO_3$ films thereon. Layers of a whole coated article with $WO_3/Ag/WO_3$ and/or $SiO_2/WO_3/Ag/WO_3$ were subsequently deposited on the substrate in one pump down cycle; a first antireflection layer, a metal layer, and a second antireflection layer to form the coated article shown in FIG. 2B FIG. 2B and FIG. 2A FIG. 2A respectively. First, a vacuum system pumped down to 10' Torr background pressure and $WO_3$ loaded crucible heated by e-beam were subsequently deposited at a rates of 3 Å/sec thereby forming the first antireflection layer of $WO_3$ at a thickness of 320 Å. Next, Ag was deposited from Ag loaded crucibles were subsequently uniformly deposited in $10^{-6}$ Torr background pressure over the first antireflection layer at a rates of 2 Å/sec thereby forming the Ag metal layer at a thickness of 90 Å. Next, $WO_3$ loaded crucible was heated by e-beam when the vacuum level reached to 10' Torr and a $WO_3$ film was subsequently uniformly deposited over the Ag metal layer at a rates of 3 Å/sec thereby forming the second antireflection layer of $WO_3$ at a thickness of 330 Å, thereby forming the transparent article of FIG. 2B having the properties further shown in Table 2 below and FIG. 6.

B. A $SiO_2/WO_3/Ag/WO_3$ Film Formed By Sputter Deposition:

In this example, a clean 2-4 mm glass or 0.1 to 0.125 mm thick Melinex substrate was used to deposit the transparent article. First, cleaned glass or Melinex substrate was introduced to the coating system by passing through a multi station sputter deposition chamber of modified Denton 40 coater. In the sputtering process a multi-region deposition environment were used e.g., reactive sputtering technique from metallic targets; sputtering gas Argon and reactive gas oxygen or nitrogen was used. For metal deposition only a sputtering gas (Argon) was used.

In general, 1 to 10 $10^{-4}$ Torr (background pressure $10^{-5}$ Torr) of vacuum level was used and sputtering power was 0.2 to 5 Watts/cm$^2$, and deposition rates ranging from 1 to 10 Å/sec for materials of $SiO_2/WO_3/Ag/WO_3$ coating system. Where $SiO_2$ films were used for adhesion enhancing performance required on polymer substrates and was deposited from 5% boron doped Si target using RF reactive sputtering. Ag films sputtered from pure Ag target using only Ar as a sputtering gas.

Deposition of First AR film (320 Å thickness $WO_3$). The glass substrate was moved under W target using a sputtering system pump down to $5 \times 10^{-5}$ Torr background pressure and increased to an operating pressure of $3 \times 10^{-3}$ by injecting operating gases. The coating station filled with Argon/Oxygen mixture for $WO_3$ deposition—where Argon was the sputtering gas and oxygen was reactive gas used to convert W metal to $WO_3$ thereby forming the first antireflection layer. For this example, the gas mixture is Argon, 45 sccm, and oxygen is 60 sccm. Deposition power was 2.2 Watt/cm$^2$ and glass moving rate is 2 m/min.

Deposition of Metal layer (90 Å thickness Ag). $WO_3$ coated glass was moved to an Ag target station and the system pumped down to $5\times10^{-5}$ Torr background pressure and increased to an operating pressure of $2\times10^{-3}$ Torr by injecting the operating gas of Argon 50 sccm for metallic Ag layer sputtering, thereby forming the metal layer. Deposition power was 1.1 Watt/cm$^2$ and glass moving rate is 2 m/min.

Second AR Film (Deposition of W buffer and conversion to $WO_3$). The $WO_3$/Ag coated glass substrate (as described immediately above) was subsequently moved under a W target with the coating system pump down to $5\times10^{-5}$ Torr background pressure and then increased to an operating pressure of $1.1\times10^{-3}$ Torr by injecting the operating gas of 20 sccm Argon. The metallic W layer of 17 A was deposited using a deposition power of 0.5 Watt/cm$^2$ thereby forming a glass substrate coated with $WO_3$/Ag/W layers. Next, the glass substrate coated with $WO_3$/Ag/W layers was positioned under W target system pump down to $5\times10^{-5}$ Torr background pressure and then increased to an operating pressure of $3\times10^{-3}$ by injecting operating gases. The coating station filled with Argon/Oxygen mixture for $WO_3$ deposition at 330 Å in thickness where Argon was the sputtering gas and oxygen was the reactive gas converting W metal to $WO_3$. For this example gas mixture was Argon at 45 sccm and oxygen at 65 sccm. Deposition power was 2.2 Watt/cm$^2$ and glass moving rate is 2 m/min.

C. A $SiO_2$/$WO_3$/Ag/$WO_3$/$WO_3$/Ag/$WO_3$ Film Formed by Sputter Deposition In this example, a clean 2-4 mm glass substrate was used to deposit the transparent article. First, cleaned glass was introduced to the coating system by passing through a multi station sputter deposition chamber of modified Denton 40 coater. In the sputtering process a multi-region deposition environment were used e.g., reactive sputtering technique from metallic targets; sputtering gas Argon and reactive gas oxygen or nitrogen was used. For metal deposition only a sputtering gas (Argon) was used.

In general, 1 to 10 $10^{-4}$ Torr (background pressure $10^{-5}$ Torr) of vacuum level was used and sputtering power was 0.2 to 5 Watts/cm$^2$, and deposition rates ranging from 1 to 10 Å/sec for materials of $SiO_2$/$WO_3$/Ag/$WO_3$/$WO_3$/Ag/$WO_3$ coating system. Where $SiO_2$ films were used for adhesion enhancing performance required on polymer substrates and was deposited from 5% boron doped Si target using RF reactive sputtering. Ag films sputtered from pure Ag target using only Ar as a sputtering gas.

Deposition of First AR film (320 Å thickness $WO_3$). The glass substrate was moved under W target using a sputtering system pump down to $5\times10^{-5}$ Torr background pressure and increased to an operating pressure of $3\times10^{-3}$ by injecting operating gases. The coating station was filled with Argon/Oxygen mixture for $WO_3$ deposition—where Argon was the sputtering gas and oxygen was reactive gas used to convert W metal to $WO_3$ thereby forming the first antireflection layer. For this example, the gas mixture is Argon, 15 sccm 45 sccm, and oxygen is 60 sccm 60 sccm. Deposition power was 2.2 Watt/cm$^2$ and glass moving rate is 2 m/min.

Deposition of Metal layer (80 Å thickness Ag). $WO_3$ coated glass was moved to an Ag target station and the system pumped down to $5\times10^{-5}$ Torr background pressure and increased to an operating pressure of $2\times10^{-3}$ Torr by injecting the operating gas of Argon 50 sccm 50 sccm for metallic Ag layer sputtering, thereby forming the metal layer. Deposition power was 1.1 Watt/cm$^2$ and glass moving rate is 2 m/min.

Center AR Film (Deposition of W buffer and conversion to $WO_3$). The $WO_3$/Ag coated glass substrate (as described immediately above) was subsequently moved under a W target with the coating system pump down to $5\times10^{-5}$ Torr background pressure and then increased to an operating pressure of $1.1\times10^{-3}$ Torr by injecting the operating gas of 20 sccm Argon. The metallic W layer of 20 Å was deposited using a deposition power of 0.5 Watt/cm$^2$ thereby forming a glass substrate coated with $WO_3$/Ag/W layers. Next, the glass substrate coated with $WO_3$/Ag/W layers remained positioned under W target system pump down to $5\times10^{-5}$ Torr background pressure and then increased to an operating pressure of $3\times10^{-3}$ by injecting operating gases. The coating station was filled with Argon/Oxygen mixture where Argon was the sputtering gas and oxygen was the reactive gas converting W metal to $WO_3$ and 650 Å nearly double in thickness $WO_3$ layer were deposited as a center antireflective layer. For this example gas mixture was Argon at 45 sccm and oxygen at 65 sccm. Deposition power was 2.2 Watt/cm$^2$ and glass moving rate is 2 m/min.

Deposition of the Second Metal layer (80 Å thickness Ag). The $WO_3$/Ag/$WO_3$/$WO_3$ coated glass was moved for the second time under Ag target station and the system pumped down to $5\times10^{-5}$ Torr background pressure and increased to an operating pressure of $2\times10^{-3}$ Torr by injecting the operating gas of Argon 50 sccm for metallic Ag layer sputtering, thereby forming the second metal layer (i.e., $SiO_2$/$WO_3$/Ag/$WO_3$/$WO_3$/Ag). Deposition power was 1.1 Watt/cm$^2$ and glass moving rate is 2 m/min.

Fourth AR Film (Deposition of W buffer and conversion to $WO_3$). The $WO_3$/Ag/$WO_3$/$WO_3$/Ag coated glass substrate was subsequently moved under a W target with the coating system pump down to $5\times10^{-5}$ Torr background pressure and then increased to an operating pressure of $1.1\times10^{-3}$ Torr by injecting the operating gas of 20 sccm Argon. The metallic W layer of 20 Å was deposited using a deposition power of 0.5 Watt/cm$^2$ thereby forming a glass substrate coated with $WO_3$/Ag/$WO_3$/$WO_3$/Ag/W layers. Next, the glass substrate coated with $WO_3$/Ag/$WO_3$/$WO_3$/Ag/W layers was positioned under W target system pump down to $5\times10^{-5}$ Torr background pressure and then increased to an operating pressure of $3\times10^{-3}$ by injecting operating gases. The coating station filled with Argon/Oxygen mixture for $WO_3$ deposition at 330 Å in thickness where Argon was the sputtering gas and oxygen was the reactive gas converting W metal to $WO_3$ (forming the $SiO_2$/$WO_3$/Ag/$WO_3$/$WO_3$/Ag/$WO_3$ coated article). For this example gas mixture was Argon at 45 sccm and oxygen at 65 sccm. Deposition power was 2.2 Watt/cm$^2$ and glass moving rate is 2 m/min.

Examples 2 and 3: $WO_3$/Ag/$WO_3$ Films Formed On Different Substrates: Examples 2 and 3 provide different formulations of the transparent articles and further show how layer thicknesses of $WO_3$ and silver (Ag) effect sample performance. As shown, for example in Table 2 below, a thicker silver layer reduces sheet resistance and enhances reflectance in the entire IR region including heat region reflectance of the coated article making the coating better low-e. AR layer thickness controls optical performance in the visible region and enhances visible transmission.

A. Example 2

Example 2 demonstrates the best window coating performance, which is high transmission in the visible region, −85%, neutral transmission and reflection colors, and emittance of e=0.5 value, which is further shown in Table 2 below. In this example, coatings were deposited on both glass and Melinex substrates by e-beam and sputtering as described above in Example 1.

Substrates in Example 2 were glass and Melinex. Optical matching layer thickness was 4000 Å thick $SiO_2$, the first AR was 350 Å thick $WO_3$, the metal layer was 110 Å thick Ag, and the second AR was 350 Å thick $WO_3$. So, the $SiO_2/WO_3/Ag/WO_3$ coated transparent article was deposited by e-beam process as described in Example 1A and the $SiO_2/WO_3/Ag/W/WO_3$ transparent article was deposited as described above in Example 1B with an optical matching layer thickness is 4000 Å thick $SiO_2$, the first AR was 350 Å thick $WO_3$, the metal layer was 110 Å thick Ag, 20 Å W, and 350 Å thick $WO_3$.

B. Example 3

Example 3 was the same as Example 2 except where Ag thickness is 175 Å and W buffer thickness is 22 Å for sputter deposition. This example may be used for a transparent and RF shielding window. The transparent article of Example 3 is 75% transparent with shielding efficiency of −42 dB. Example 3 is, for example, a sample shown in FIG. 2A and the performance characteristics are further provided in Table 2 below. The coating was deposited on both glass and Melinex substrates. Layer thicknesses of the transparent article are: begin with the desired substrate, deposit the optical matching layer at 4000 Å thickness; deposit the first AR 140 at 380 Å thickness of $WO_3$, deposit a metal layer at a 175 Å thickness of Ag, deposit second AR 160 at a 380 Å thickness of $WO_3$ Sputtered equivalents of this example require thicker W buffer of e.g., 18-22 Å.

Figure 9C:
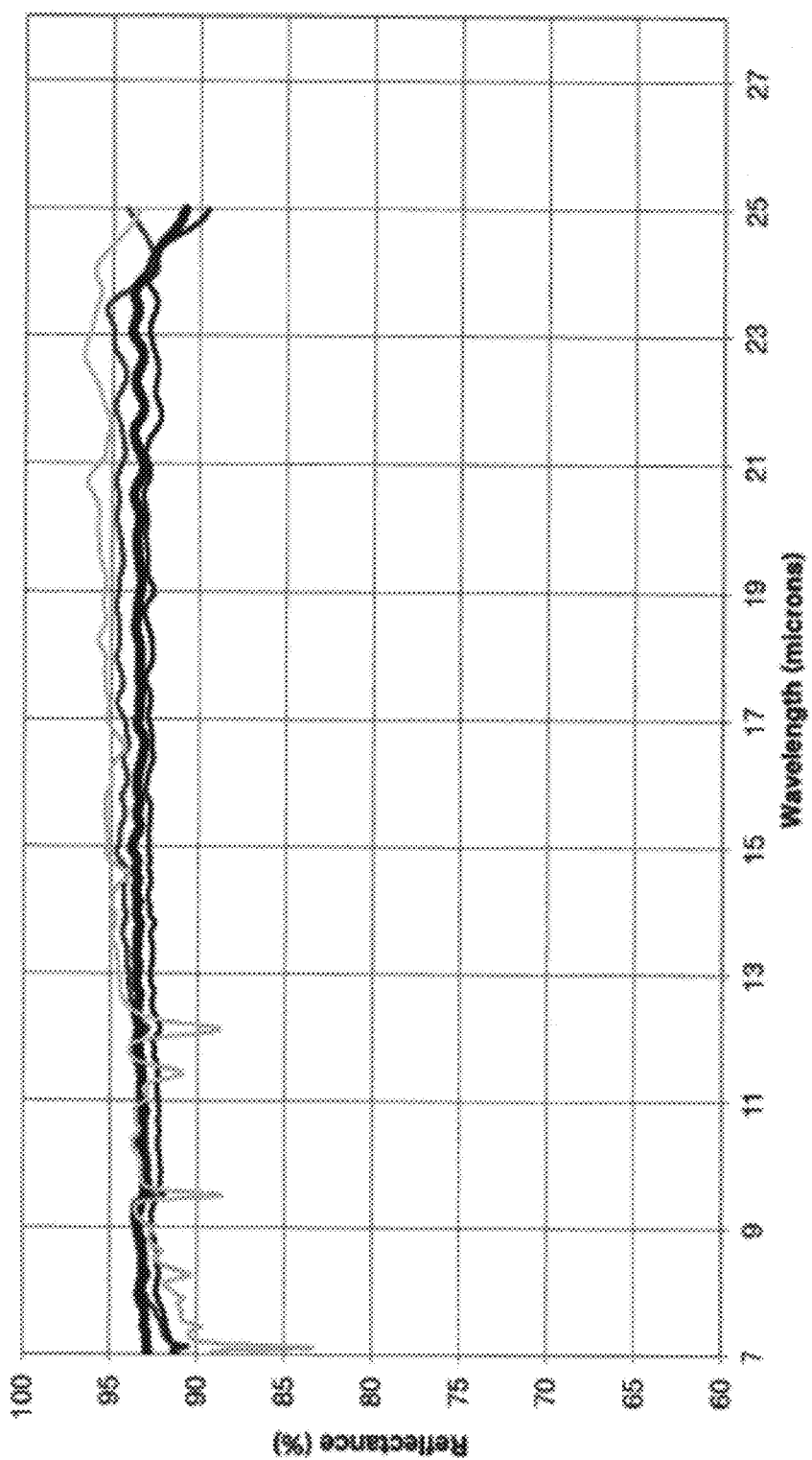
FIG. 9C depicts an extended heat region and FTIR reflectance graphs of the transparent articles, which are further detailed in Example 2, coated with 1500 Å, 2500 Å, and 5000 Å protective transparent coatings respectively.

Table 2 below summarizes performance of Examples 1-3.

deposition occurs at 0.1 Torr vacuum pressure means free path of the gas molecules is ~ 0.1 cm, and the coating formed is conformal in which the film covers the surface 3 dimensionally. Parylene coats front and back surface of the substrates. When only a front side coating is desired, the back side of the substrate must be masked. This example describes deposition of the transparent overcoat 170 as shown in FIGS. 3A and 3B. Different thicknesses, from 100 Å to 10,000 Å. The parylene coated transparent articles shown in FIGS. 3A and B were evaluated in terms of visible transparency and heat region transparency and mechanical chemical integrity. FIGS. 9A, 9B, and 9C show optical performance of some samples. All coatings are washable, blow dryable and gently cleanable with a soft cloth. Coating thickness may be modified for cleanable, optically haze free, no absorption conditions.

Measurements:

Sheet resistance of the conductive coating were measure by Surface resistivity Meter SMR-232 from Guardian Manufacturing Inc. Spectral transmission and reflection of the coated samples were measured by Perkin Elmer UV/Vis/NIR spectrophotometer Model Lambda 1050 equipped with 150 mm WB InGaAs integrating sphere. Infrared spectrel reflectance measurement were measured by Perkin Elmer Frontier Optica FTIR (Fourier Transformed Infrared) equipment capable to measure from 1.3 to 25 micron region. Film thicknesses are measured by KLA Tencor Model P-6.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

TABLE 2

| Examples | Transmittance[1] T (%) at 5500 Å | Sheet Resistance[2] Rs (Ohm/sq) | FTIR Reflectance measured at 300K; 9.66 μm λ(μm) = 2898/T(K)[3] | Emittance (e) e = Absorption e = 1 − R | Shielding Efficiency SE (dB) $20 \log_{10}(1 + (377 \Omega/2Rs))$ |
|---|---|---|---|---|---|
| Example 1 (FIG. 6) | 90.5 | 10 | 0.92 | 0.08 | −25 (dB) |
| Example 2 (FIG. 8A) | 86 | 4.1 | 0.96 | 0.04 | −32 (dB) |
| Example 3 (FIG. 8A) | 75 | 1.7 | 0.98 | 0.02 | −42 (dB) |

[1]Measured with a Perkin-Elmer Vis-Near IR Spectrometer
[2]Measured with a Four Point Probe
[3]Wien Displacement Law (D.L. Smith "Thin Film Deposition" McGraw Hill, N.Y. (1995))

Example 4: Depositing the Outer Protective Layer on the Transparent Article(s)

Parylene N is a poli-para-xylylene and Parylene C produced from the same monomer modified by the substituting of a chlorine atom for one of the aromatic hydrogen. Parylene films were deposited on the transparent articles as shown in FIGS. 3A and 3B by using PlasmaTeck Model S300 coating equipment. A thermally heatable crucible was loaded with 2 g per 1μ thick of a predefined precursor dimer material and substrates were loaded for parylene coating. The dimer evaporates under 0.1 Torr vacuum level at 150° C. heated crucible. Pyrolysis of the dimer occurs at 680° C. by forming two methylene-methylene bonds to yield para-xylylene then film deposits at 0.1 Torr and 25° C. Since

What is claimed is:

1. A transparent article comprising:
   (a) a substrate adapted for carrying a transparent and electrically conductive thin film thereon, the thin film including a first antireflection layer, a metal layer adapted for infra-red reflection and electrical conductivity, and a second antireflection layer;
   (b) the first antireflection layer is directly deposited on the substrate at a thickness ranging from 100 Å to 1,000 Å;
   (c) the metal layer adapted for infra-red reflection and electrical conductivity is directly deposited on the first antireflection layer; and (d) the second antireflection layer is directly deposited on the metal layer adapted for infra-red reflection at a thickness ranging from 100 Å to 1,000 Å, and, wherein:
no layer is positioned between the metal layer adapted for infra-red reflection and electrical conductivity and the second antireflection layer; and the article has an optical transparency of at least 30% between a wavelength ranging from 380 nm to 780 nm and has at least 30% solar reflectance at a wavelength ranging from 380 nm to 2,200 nm, and
the article has an electrical sheet resistance of ranging from 1 to 100 Ohm/sq.

2. The transparent article of claim 1, wherein the first and second antireflection layers independently comprise at least one of W or oxides thereof, Sn or oxides thereof, Ti or oxides or nitrides thereof, Al or oxides thereof, Ta or oxides thereof, Hf or oxides thereof, Nb or oxides thereof, indium tin oxide (ITO), Bi or oxides thereof, Ce or oxides thereof, Pr or oxides thereof, Ni or oxides thereof, aluminum doped zinc oxide (AZO), or indium zinc oxide (IZO).

3. The transparent article of claim 2, wherein the first and second antireflection layers each comprise W or oxides thereof.

4. The transparent article of claim 3, wherein the first antireflection layer is $WO_3$.

5. The transparent article of claim 4, wherein the second antireflection layer is W and $WO_3$.

6. The transparent article of claim 4, wherein the second antireflection layer is $WO_3$.

7. The transparent article of claim 4, wherein the metal layer adapted for infra-red reflection and electrical conductivity comprises at least one of Ag, Au, Ag—Au, Cu, Al, Pd, Pt, Ni, Rd, or Zn.

8. The transparent article of claim 7, wherein the metal layer adapted for infra-red reflection and electrical conductivity is Ag.

9. The transparent article of claim 8, wherein the substrate is either rigid or flexible.

10. The transparent article of claim 1, wherein the substrate is glass.

11. The transparent article of claim 10, wherein the transparent and electrically conductive thin film maintains, without loss, optical and electrical properties for up to nine years when stored at ambient humidity and/or room temperature.

12. The transparent article of claim 11, wherein each of the first antireflection layer, the metal layer, and the second antireflection layer are uniformly deposited in the article.

13. The transparent article of claim 12, wherein an outermost protective transparent layer is present in the article.

14. The transparent article of claim 1, wherein the article is an electrode.

15. The transparent article of claim 14, wherein the electrode is adapted for use in an electrochromic device.

16. The transparent article of claim 14, wherein the electrode is adapted for use in a liquid crystal device and/or or a liquid crystal display.

17. The transparent article of claim 14, wherein the electrode is adapted for use in a light emitting diode.

18. The transparent article of claim 14, wherein the electrode is adapted for use in a photovoltaic device.

19. The transparent article of claim 1, wherein the article is adapted for adhering to a glass window.

20. The transparent article of claim 19, wherein the article includes electromagnetic interference shielding properties having an attenuation of from −10 dB to −45 dB at a frequency of 1 GHz to 100 GHz.

21. The transparent article of claim 1, wherein the article is adapted for retrofitting onto a glass window.

22. The transparent article of claim 21, wherein the article includes electromagnetic interference shielding properties having an attenuation of from −10 dB to −45 dB at a frequency of 1 GHz to 100 GHz.

23. The transparent article of claim 1, wherein
a third antireflection layer is directly deposited on the second antireflection layer at a thickness ranging from 100 Å to 1,000 Å, the third antireflection layer made from the same material and having substantially the same thickness as the first antireflection layer;
a second metal layer adapted for infra-red reflection and electrical conductivity is directly deposited on the third antireflection layer at a thickness ranging from 50 Å to 400 Å; and
a fourth antireflection layer that is directly deposited on the second metal layer adapted for infra-red reflection at a thickness ranging from 100 Å to 1,000 Å, the fourth antireflection layer made from the same material and having substantially the same thickness as the second antireflection layer.

24. The transparent article of claim 1, further comprising an outermost protective transparent layer having a thickness ranging from 500 Å to 5,000 Å.

25. The transparent article of claim 1, further comprising an outermost protective transparent layer having a thickness ranging from 1,000 Å to 3.000 Å.

26. The transparent article of claim 1, wherein the deposited metal layer comprises a maximum thickness of 400 Å.

27. A method of preparing a transparent article, the method comprising:
(a) providing a substrate adapted to carry a transparent and electrically conductive thin film thereon, the thin film including a first antireflection layer, a metal layer adapted for infra-red reflection and electrical conductivity, a second antireflection layer;
(b) depositing the first antireflection layer directly on the substrate at a thickness ranging from 100 Å to 1,000 Å;
(c) depositing the metal layer adapted for infra-red reflection and electrical conductivity directly deposited on the first antireflection layer; and
(d) depositing the second antireflection layer directly on the metal layer adapted for infra-red reflection at a thickness ranging from 100 Å to 1,000 Å thereby forming the transparent article, wherein:
no layer is positioned between the metal layer adapted for infra-red reflection and electrical conductivity and the second antireflection layer,
the transparent and electrically conductive thin film maintains, without loss, optical and electrical properties for up to nine years stored at ambient humidity and/or room temperature, and
the article has an optical transparency of at least 30% between a wavelength ranging from 380 nm to 780 nm and has at least 30% solar reflectance at a wavelength ranging from 380 nm to 2,200 nm, and
the article has an electrical sheet resistance of ranging from 1 to 100 Ohm/sq.

28. The method of claim 27, wherein at least one of the layers deposited during steps (b)-(d) is deposited by sputtering deposition.

29. The method of claim 27, wherein each layer deposited during steps (b)-(d) is deposited by sputtering deposition.

30. The method of claim 27, wherein at least one of the layers deposited during steps (b)-(d) is deposited by electron beam (e-beam) deposition.

31. The method of claim 27, wherein each layer deposited during steps (b)-(d) is deposited by e-beam deposition.

32. The method of claim 27, the deposited metal layer comprises a maximum thickness of 400 Å.

33. The method of claim 27, wherein the thin film further includes, an outermost protective transparent layer, and the method further includes step (e) depositing the outermost protective transparent layer on the second antireflection layer at a thickness ranging from 100 Å to 10,000 Å.

* * * * *